US011671902B2

(12) United States Patent
Kadiri et al.

(10) Patent No.: US 11,671,902 B2
(45) Date of Patent: Jun. 6, 2023

(54) APPARATUS AND METHODS FOR NEW RADIO BROADCAST AND MULTICAST ACCESS CONTROL

(71) Applicant: QUALCOMM Incorporated, San Diego, CA (US)

(72) Inventors: Prasad Reddy Kadiri, San Diego, CA (US); Le Liu, Fremont, CA (US); Alberto Rico Alvarino, San Diego, CA (US); Umesh Phuyal, San Diego, CA (US); Bharat Shrestha, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/357,832

(22) Filed: Jun. 24, 2021

(65) Prior Publication Data

US 2021/0410045 A1   Dec. 30, 2021

Related U.S. Application Data

(60) Provisional application No. 63/044,339, filed on Jun. 25, 2020.

(51) Int. Cl.
*H04W 48/10*   (2009.01)
*H04W 76/27*   (2018.01)
(Continued)

(52) U.S. Cl.
CPC ............. *H04W 48/10* (2013.01); *H04W 4/06* (2013.01); *H04W 48/20* (2013.01); *H04W 76/27* (2018.02)

(58) Field of Classification Search
CPC ....... H04W 4/06; H04W 48/10; H04W 48/12; H04W 48/18; H04W 48/20; H04W 76/27;
(Continued)

(56) References Cited

U.S. PATENT DOCUMENTS

2011/0199905 A1*   8/2011   Pinheiro ................. H04W 4/70
                                                              370/235
2014/0128029 A1     5/2014   Fong et al.
(Continued)

FOREIGN PATENT DOCUMENTS

EP          3403443 A1   11/2018

OTHER PUBLICATIONS

International Search Report and Written Opinion—PCT/US2021/039228—ISA/EPO—dated Oct. 28, 2021.
(Continued)

*Primary Examiner* — Jean A Gelin
(74) *Attorney, Agent, or Firm* — Loza & Loza, LLP

(57) ABSTRACT

This disclosure relates to techniques for providing access control for multicast or broadcast (MC/BC) services. A base station broadcasts one or more cell barring parameters to a group of user equipment (UEs) that indicate whether the UEs of the group of UEs is permitted to select the cell of the base station for receiving the MC/BC services. The base station also broadcasts one or more access control parameters to a set of one or more UEs, of the group of UEs, that are indicated to be permitted to select the cell for receiving the MC/BC services based on the one or more cell barring parameters. The one or more access control parameters indicate whether the set of one or more UEs is permitted to establish or resume the RRC connected state with the base station for receiving the MC/BC services.

26 Claims, 10 Drawing Sheets

(51) Int. Cl.
*H04W 4/06* (2009.01)
*H04W 48/20* (2009.01)

(58) Field of Classification Search
CPC . H04W 8/24; H04W 36/305; H04W 36/0033; H04W 36/08; H04L 12/26; H04L 47/2441
See application file for complete search history.

(56) References Cited

U.S. PATENT DOCUMENTS

| | | | | |
|---|---|---|---|---|
| 2015/0029854 | A1* | 1/2015 | Starsinic | H04W 4/70 370/235 |
| 2015/0257161 | A1* | 9/2015 | Hsu | H04W 72/52 455/453 |
| 2016/0374006 | A1* | 12/2016 | Chen | H04W 76/18 |
| 2017/0251353 | A1* | 8/2017 | Pinheiro | H04W 48/02 |
| 2018/0027479 | A1 | 1/2018 | Ahmad et al. | |
| 2019/0261261 | A1* | 8/2019 | Ishii | H04W 48/06 |
| 2019/0320485 | A1* | 10/2019 | Kim | H04W 76/25 |
| 2019/0357109 | A1* | 11/2019 | Hong | H04W 76/19 |
| 2020/0008075 | A1* | 1/2020 | Ahmavaara | H04W 16/14 |
| 2020/0084695 | A1 | 3/2020 | Choe et al. | |

OTHER PUBLICATIONS

Qualcomm Inc: "NR MBS Control Signalling Aspects for UEs in Different RRC States", 3GPP TSG-RAN WG2 Meeting #114e, 3GPP Draft, R2-2105013, 3rd Generation Partnership Project (3GPP), Mobile Competence Centre, 650, Route Des Lucioles, F-06921 Sophia-Antipolis Cedex, France, vol. RAN WG2, No. E-Meeting, May 19, 2021-May 28, 2021, May 11, 2021 (May 11, 2021), 8 Pages, XP052006732, Retrieved from the Internet: URL: https://www.3gpp.org/ftp/tsg_ran/WG2_RL2/TSGR2_114-e/Docs/R2-2105013.zip, R2-2105013 NR MBS Control Signalling Aspects for UEs in Different RRC States v1.doc, [retrieved on May 11, 2021], The whole document.

* cited by examiner

| Access Identity Numbers | User Equipment Configuration |
|---|---|
| 0 | User equipment is not configured with any parameters from this table |
| 1 (NOTE 1) | User equipment is configured for multimedia priority service (MPS) |
| 2 (NOTE 2) | User equipment is configured for mission critical service (MCS) |
| 3-10 | Reserved for future use |
| 11 (NOTE 3) | Access Class 11 is configured in the user equipment |
| 12 (NOTE 3) | Access Class 12 is configured in the user equipment |
| 13 (NOTE 3) | Access Class 13 is configured in the user equipment |
| 14 (NOTE 3) | Access Class 14 is configured in the user equipment |
| 15 (NOTE 3) | Access Class 15 is configured in the user equipment |

| Access Category Numbers | Conditions Related to the User Equipment | Type of Access Attempt |
|---|---|---|
| 0 | All | MO signalling resulting from paging |
| 1 (NOTE 1) | Use equipment is configured for delay tolerant service and subject to access control for Access Category 1, which is judged based on relation of user equipment's Home Public Land Mobile Network and the selected Public Land Mobile Network | All except for Emergency, or MO exception data |
| 2 | All | Emergency |
| 3 | All except for the conditions in Access Category 1 | MO signalling on NAS level resulting from other than paging |
| 4 | All except for the conditions in Access Category 1 | MMTEL voice (NOTE 3) |
| 5 | All except for the conditions in Access Category 1 | MMTEL video |
| 6 | All except for the conditions in Access Category 1 | SMS |
| 7 | All except for the conditions in Access Category 1 | MO data that does not belong to any other Access Category (NOTE 4) |
| 8 | All except for the conditions in Access Category 1 | MO signalling on RRC level resulting from other than paging |
| 9 | All except for the conditions in Access Category 1 | MO IMS registration related signalling (NOTE 5) |
| 10 (NOTE 6) | All | MO exception data |
| 11-31 | | Reserved standardized access categories |
| 32-63 (NOTE 2) | All | Based on operator classification |

FIG. 5

APPARATUS AND METHODS FOR NEW RADIO BROADCAST AND MULTICAST ACCESS CONTROL

CROSS-REFERENCE TO RELATED APPLICATIONS

The present application for patent claims priority to and the benefit of U.S. Provisional Application No. 63/044,339, titled "APPARATUS AND METHODS FOR NEW RADIO BROADCAST AND MULTICAST ACCESS CONTROL" filed Jun. 25, 2020, and assigned to the assignee hereof and hereby expressly incorporated by reference herein as if fully set forth below in its entirety and for all applicable purposes.

TECHNICAL FIELD

The present disclosure relates generally to wireless communication systems, and more particularly, to providing access control for the reception of multicast or broadcast services.

INTRODUCTION

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some aspects, a user equipment (UE) may camp on a base station or a cell by selecting a cell to receive system information, for example, through a control channel. In some wireless communications systems, such as a fifth generation (5G) new radio (NR) wireless network, the UE may seek to receive one or more unicast services or one or more multicast or broadcast services (hereinafter referred to collectively as "multicast broadcast services"). A unicast transmission is a transmission from a single point in the network (for example, a base station) to another single point in the network (for example, a UE). In contrast, a multicast or broadcast transmission (hereinafter referred to collectively as a "multicast broadcast transmission") is a single-point-to-multi-point transmission, such as from a base station to a group of UEs in a cell of the base station. A base station may provide unicast services to multiple UEs via individual unicast transmissions to the respective UEs as well as multicast broadcast services to a group of UEs via multicast broadcast transmissions to the group of UEs. In some scenarios, a base station may experience an overload condition, for example, when a quantity of UEs in the RRC connected state with the cell of the base station is greater than a threshold quantity.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

A method for wireless communication by a base station is provided. The method includes broadcasting one or more cell barring parameters to a group of user equipment (UEs) that indicate whether UEs in the group of UEs are permitted to select a cell of the base station for receiving the multicast or broadcast services. The method also includes broadcasting one or more access control parameters to a set of one or more UEs, of the group of UEs, that is indicated to be permitted to select the cell for receiving the multicast or broadcast services based on the one or more cell barring parameters. The one or more access control parameters indicate whether the set of one or more UEs is permitted to establish or resume a radio resource control (RRC) connected state with the base station for receiving the multicast or broadcast services.

A base station is provided. The base station includes a transceiver for wireless communicating with a user equipment (UE). The base station also includes one or more processors electronically coupled to the transceiver. The one or more processors are configured to broadcast one or more cell barring parameters to a group of UEs that indicate whether UEs are permitted to select a cell of the base station for receiving the multicast or broadcast services. The one or more processors are also configured to broadcast one or more access control parameters to a set of one or more UES, of the group of UEs, that are indicated to be permitted to select the cell for receiving the multicast or broadcast services based on the one or more cell barring parameters. The one or more access control parameters indicate whether the set of one or more UEs is permitted to establish or resume a radio resource control (RRC) connected state with the base station for receiving the multicast or broadcast services.

A method for wireless communication by a user equipment (UE) is provided. The method includes receiving one or more cell barring parameters from a base station indicating whether the UE is permitted to select a cell of the base station for receiving multicast or broadcast services. The method also includes receiving one or more access control parameters from the base station indicating whether the UE is permitted to establish or resume a radio resource control (RRC) connected state with the base station for receiving the multicast or broadcast services based on the one or more cell barring parameters indicating that the UE is permitted to select the cell of the base station for receiving multicast or broadcast services. The method further includes transmitting an access request message to establish or resume the RRC connected state with the base station for receiving the multicast or broadcast services based on the one or more access control parameters.

A user equipment (UE) is provided. The UE includes a transceiver for wirelessly communicating with a base station. The UE also includes one or more processors electronically coupled to the transceiver. The one or more processors are configured to receive one or more cell barring parameters from a base station indicating whether the UE is permitted to select a cell of the base station for receiving multicast or broadcast services. The one or more processors are also configured to receive one or more access control parameters from the base station indicating whether the UE is permitted to establish or resume a radio resource control (RRC) connected state with the base station for receiving the multicast or broadcast services based on the one or more cell barring parameters indicating that the UE is permitted to select the cell of the base station for receiving the multicast or broadcast services. The one or more processors are further configured to transmit an access request message to establish or resume the RRC connected state with the base station for receiving the multicast or broadcast services based on the one or more access control parameters.

These and other aspects of the present disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

BRIEF DESCRIPTION OF THE DRAWINGS

FIG. 4 is a table illustrating an example mapping of access identity values to barring parameters for controlling multicast and broadcast access in accordance with some aspects of the disclosure.

FIG. 5 is a table illustrating an example mapping of access category values to barring parameters for controlling multicast and broadcast access in accordance with some aspects of the disclosure.

DETAILED DESCRIPTION

Figure 1:
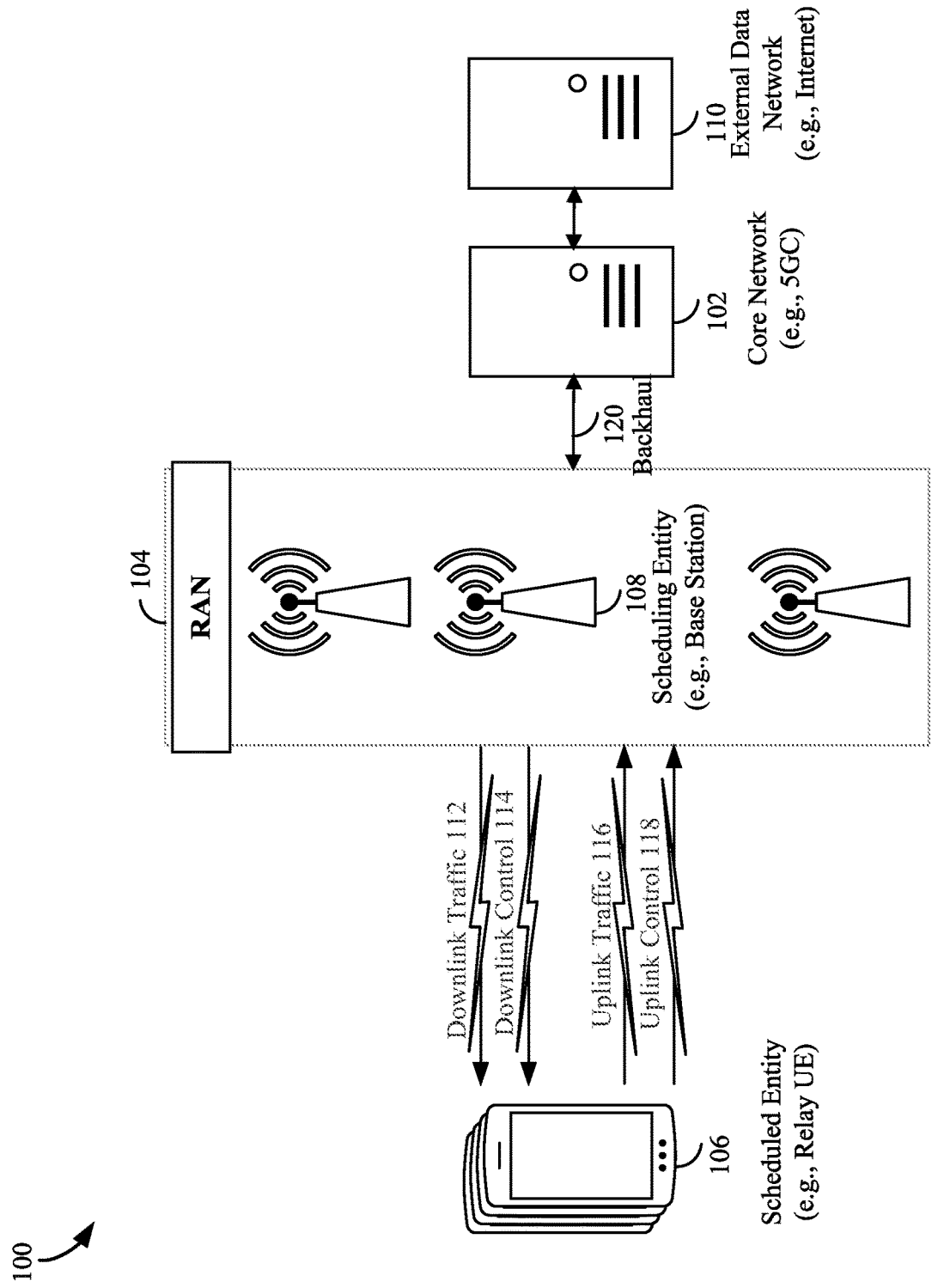
FIG. 1 is a schematic illustration of an example wireless communication system.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In some wireless communications systems, such as a fifth generation (5G) new radio (NR) wireless network, one or more wireless devices may seek to receive one or more unicast services or one or more multicast or broadcast services (hereinafter referred to collectively as "multicast broadcast services"). A unicast transmission is a transmission from a single point in the network (for example, a base station) to another single point in the network (for example, a user equipment (UE)). In contrast, a multicast or broadcast transmission (hereinafter referred to collectively as a "multicast broadcast transmission") is a single point to multi-point transmission, such as from a base station to a group of UEs in a cell of the base station. A base station may provide unicast services to multiple UEs via individual unicast transmissions to the respective UEs as well as multicast broadcast services to a group of UEs via multicast broadcast transmissions to the group of UEs.

In Release 17 3GPP systems, a UE may receive NR multicast broadcast services while in an idle state or an inactive state (for example, an RRC_IDLE state or an RRC_INACTIVE state). In addition, a UE may receive NR multicast broadcast services in a connected state (for example, an RRC_CONNECTED state). However, while a UE is in an idle state or an inactive state, the UE may be unable to provide feedback to the network (for example, the base station). Conversely, while the UE is in the connected state, the UE may be able to provide L1/L2 feedback to the network for any multicast broadcast service received from the network or base station. Thus, it may be advantageous to increase the number UEs in the connected state when the UEs are receiving multicast broadcast services because the network can improve the reliability of the multicast broadcast service based on the feedback. For example, using feedback from UEs in the connected state, a base station may retransmit multicast broadcast services to achieve a higher reliability. However, too many UEs operating in an RRC connected state for receiving multicast broadcast services may cause overloading at the base station. As such, the base station may perform access overload control (or simply "access control") to limit the number of UEs that are permitted to enter into the RRC connected state for the purpose of receiving multicast broadcast services.

Various aspects of the present disclosure relate to controlling access by UEs to receiving multicast broadcast services. According to some aspects, a base station broadcasts one or more cell barring parameters to a group of UEs that inform the UEs as to whether the base station is configured for providing multicast broadcast services. In some aspects, a base station broadcasts one or more cell barring parameters to restrict UEs from camping on a cell for receiving multicast broadcast services to prevent or alleviate congestion at the base station. A UE that receives the broadcast cell barring parameters may camp on the cell of the base station for receiving the multicast broadcast services based on the cell barring parameters permitting the UE to camp on the cell. In some aspects, the base station may also configure one or more access control parameters for UEs to provide access to an individual UE or a set of UEs to receive one or more multicast broadcast services. The access control parameters may be associated with at least one of one or more specific multicast broadcast services, one or more barring factors, or one or more barring times. One or more of the access control parameters may inform the UE as to whether the UE is permitted to establish or resume an RRC connected state with the base station. Using the access control parameters, the UE may identify whether and when to transmit an access request message to the base station for establishing or resuming an RRC connected state with the base station.

For example, when the one or more access control parameters are associated with a first multicast broadcast service, but not a second (e.g., different) multicast broadcast service, the UE may transmit an access request message when the UE seeks to receive the first multicast broadcast service and abstain from transmitting the access request message when the UE seeks to receive the second multicast broadcast service (and not the first multicast broadcast service). This may allow the base station to limit a quantity of UEs camping on the cell in an RRC connected state to only UEs seeking to use one or more particular multicast broadcast services to reduce/limit overhead and/or data throughput. As another example, the base station may set one or more cell barring factors (e.g., values) to control the likelihood that a random number generated by the UE is no less than or greater than the one or more cell barring factors. When a random number generated by the UE is no less than or is greater than a cell barring factor, the UE may be permitted to transmit an access request message for entering an RRC connected state. Increasing a cell barring factor may increase the likelihood that the UE will be delayed in transitioning to an RRC connected state and decreasing a cell barring factor may decrease the likelihood that the UE will be delayed in transitioning to an RRC connected state. As yet another example, the base station may set one or more cell barring times to control the frequency by which the UE generates a random number for comparison with the one or more cell barring factors. Increasing a cell barring time may decrease the frequency of opportunities the UE has to generate the random number for comparison with the one or more cell barring factors and decreasing a cell barring time may increase the frequency of opportunities the UE has to generate the random number for comparison with the one or more cell barring factors. The base station may configure the one or more cell barring factors and the one or more cell barring times to maintain or limit (for example, to be below a threshold) a quantity of UEs that may be camped on the base station for receiving the one or more multicast broadcast services and/or to maintain or limit (for example, to be below a threshold) a data rate of data being transmitted through the base station. Controlling a quantity of UEs and/or a data rate through the base station may allow the base station to increase the feedback for improving the reliability or quality of multicast broadcast services and may also prevent or reduce the occurrences of an overload condition.

Particular aspects of the subject matter described in this disclosure can be implemented to realize one or more of the following potential advantages. In some examples, the described techniques can be used to monitor or improve the reliability of providing multicast broadcast services via feedback from a group of UEs while maintaining quality of service and reducing congestion. For example, by delaying the transmission of an access request message, by a UE seeking multicast broadcast services to a base station providing the multicast broadcast services, the base station may increase the feedback for improving the reliability or quality of multicast broadcast services while preventing an overload condition. As another example, by configuring the barring factors and barring times, the base station may be able to control the likelihood of the UE being able to transmit the access request message to the base station. Delaying the UE from transmitting the access request message may also allow enough time for one or more other UEs to transition from the RRC connected state to the RRC idle state or the RRC inactive state, and as a result, enable the UE to enter the RRC connected state. In this way, the base station can maintain the quantity of UEs in the RRC connected state to below the threshold quantity While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (for example, end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (for example, hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, or the like of varying sizes, shapes, and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, for example, corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer or wearable device, such as eyewear, a wearable camera, a virtual reality device, a smart watch, a health or fitness tracker, a digital audio player (for example, MP3 player), a camera, a game console, etc. A mobile apparatus may additionally be a digital home or smart home device such as a home audio, video, or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (for example, a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, for example, health care at a distance. Telehealth devices may include telehealth monitoring devices and telehealth administration devices, whose communication may be given preferential treatment or prioritized access over other types of information, for example, in terms of prioritized access for transport of critical service data, or relevant QoS for transport of critical service data.

Wireless communication between a RAN 104 and a UE 106 may be described as utilizing an air interface. Transmissions over the air interface from a base station (for example, base station 108) to one or more UEs (for example, UE 106) may be referred to as downlink (DL) transmission. In accordance with certain aspects of the present disclosure, the term downlink may refer to a point-to-multipoint transmission originating at a scheduling entity (described further below; for example, base station 108). Another way to describe this scheme may be to use the term broadcast channel multiplexing. Transmissions from a UE (for example, UE 106) to a base station (for example, base station 108) may be referred to as uplink (UL) transmissions. In accordance with further aspects of the present disclosure, the term uplink may refer to a point-to-point transmission originating at a scheduled entity (described further below; for example, UE 106).

In some examples, access to the air interface may be scheduled, wherein a scheduling entity (for example, a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (for example, one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (for example, a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (for example, 5GC). In other examples, the core network 102 may be configured according to a 4G evolved packet core (EPC), or any other suitable standard or configuration.

Figure 2:
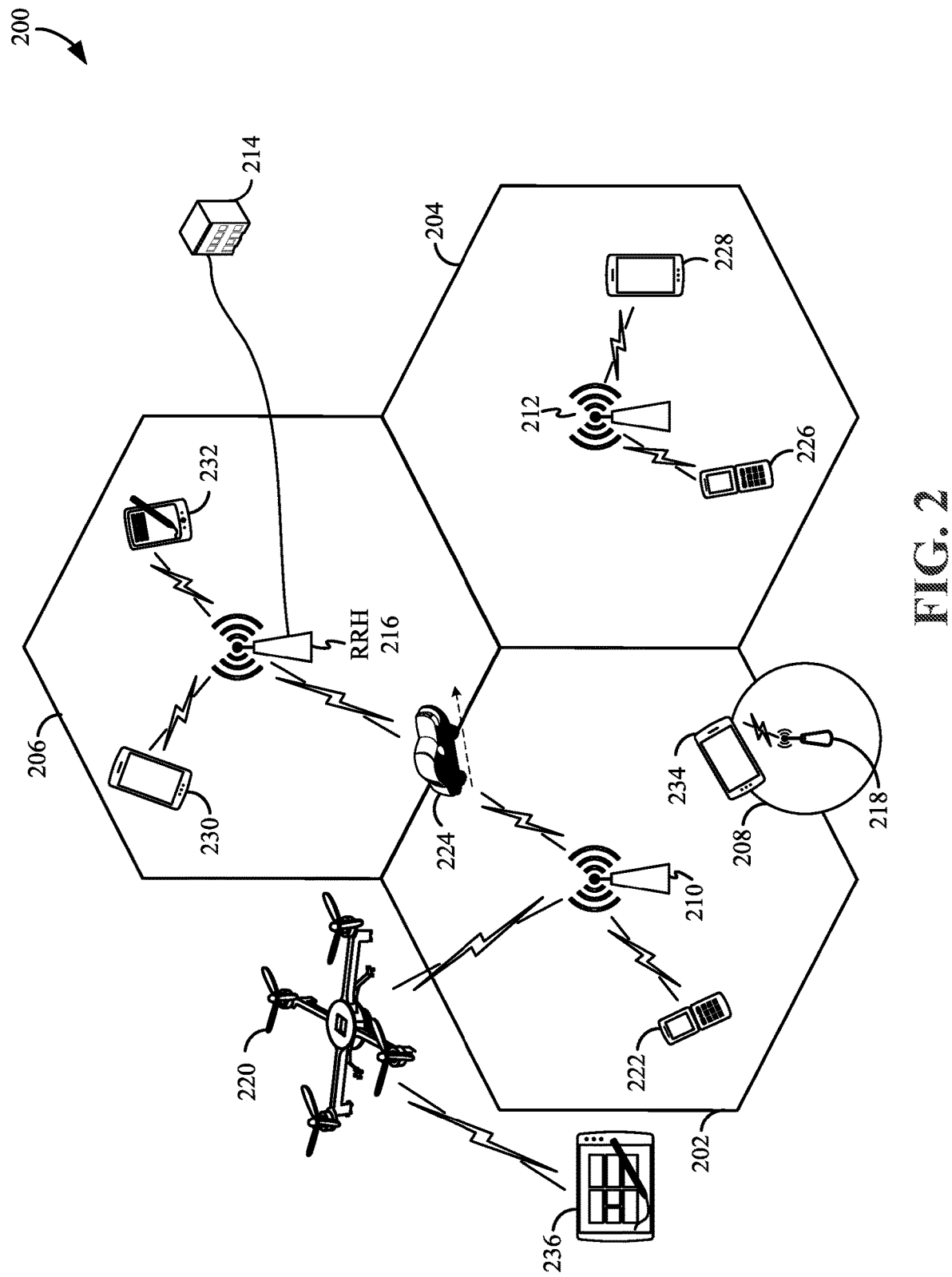
FIG. 2 is a conceptual illustration of an example radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (for example, a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, or 236 may be the same as the UE/scheduled entity 106 described herein and illustrated in FIG. 1.

In some examples, a mobile network node (for example, quadcopter 220) may be configured to function as a UE. For example, the quadcopter 220 may operate within cell 202 by communicating with base station 210.

In the radio access network 200, the ability for a UE to communicate while moving, independent of its location, is referred to as mobility. The various physical channels between the UE and the radio access network are generally set up, maintained, and released under the control of an access and mobility management function (AMF, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i. e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (for example, unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (for example, UE 224) may be concurrently received by two or more cells (for example, base stations 210 and 214/216) within the radio access network 200. Each of the cells may measure a strength of the pilot signal, and the radio access network (for example, one or more of the base stations 210 and 214/216 or a central node within the core network) may identify a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators or multiple RATs. For example, the holder of a license for a portion of licensed spectrum may provide licensed shared access (LSA) to share that spectrum with other parties, for example, with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can transmit information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, for example, several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The channels or carriers described above and illustrated in FIGS. 1 and 2 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In Release 17 3GPP systems, a UE may receive NR multicast broadcast services while in an idle state or an inactive state (for example, an RRC_IDLE state or an RRC_INACTIVE state). In addition, a UE may receive NR multicast broadcast services in a connected state (for example, an RRC_CONNECTED state). However, while a UE is in an idle state or an inactive state, the UE may be unable to provide feedback to the network (for example, the base station). Conversely, while the UE is in the connected state, the UE may be able to provide L1/L2 feedback to the network for any multicast broadcast service received from the network or base station. Thus, it may be advantageous to increase the number UEs in the connected state when the UEs are receiving multicast broadcast services because the network can improve the reliability of the multicast broadcast service based on the feedback. For example, using feedback from UEs in the connected state, a base station may retransmit multicast broadcast services to achieve a higher reliability. However, too many UEs operating in an RRC connected state for receiving multicast broadcast services may cause overloading at the base station. As such, the base station may perform access overload control (or simply access control) to limit the number of UEs that are permitted to enter into the RRC connected state for the purpose of receiving multicast broadcast services.

Various aspects of the present disclosure relate to controlling access by UEs to receiving multicast broadcast services. According to some aspects, a base station broadcasts one or more cell barring parameters to restrict UEs from camping on a cell for receiving multicast broadcast services. In some aspects, the base station may also configure unified access control parameters for UEs to provide access to an individual UE or a set of UEs to receive one or more multicast broadcast services. A UE may camp on a base station or a cell by selecting a cell to receive system information, for example, through a control channel. A UE that receives the broadcast cell barring parameters may camp on the cell of the base station for receiving the multicast broadcast services based on the cell barring parameters permitting the UE to camp on the cell. Upon or after camping on the cell, the UE may seek to transition to a connected state (for example, a radio resource control (RRC) connected state) with the base station to receive the multicast broadcast services. The UE may then initiate a random access (RACH) procedure to establish or resume the RRC connected state. During the random access procedure, the base station may receive a RACH message 3 or message A (for example, including an RRC setup request message or an RRC resume request message) including an RRC establishment cause or resume cause for multicast broadcast services from the UE requesting access to the one or more multicast broadcast services based on the one or more configured unified access control parameters. The base station may transmit a response message (for example, an RRC_REJECT message) in a RACH message 4 or a message B indicating whether the UE is rejected from establishing or resuming the RRC connection state to receive the one or more multicast broadcast services.

Particular aspects of the disclosed techniques enable a base station to control a UE's ability to enter into a connected state with a cell of the base station for receiving multicast broadcast services to prevent or alleviate congestion at the base station. For example, a base station may broadcast one or more barring parameters to a group of UEs that inform the UEs as to whether the base station is configured for providing multicast broadcast services. The UEs in the group may select the cell of the base station (for example, camp on the cell of the base station) for receiving multicast broadcast services after receiving the one or more barring parameters and identifying that the base station is configured for multicast broadcast services.

The base station may also provide (for example, broadcast to) the UE (or a set of UEs) with one or more access control parameters that inform the UE as to whether the UE is permitted to establish or resume an RRC connected state with the base station. The access control parameters may be associated with multicast broadcast services, one or more barring factors, or one or more barring times. By configuring the barring factors and barring times, the base station may be able to control the likelihood of the UE being able to transmit an access message to the base station requesting an establishment of the RRC connected state or a reestablishment (for example, a resumption) of the RRC connected state to receive the multicast broadcast services.

In some scenarios, a base station may experience an overload condition, for example, when a quantity of UEs in the RRC connected state with the cell of the base station is greater than a threshold quantity. When experiencing, or to prevent, an overload condition, the base station may configure a barring factor or a barring time to delay the UE from transmitting an access message to the base station or to increase the likelihood of delaying the transmission of the access message by the UE. Delaying the UE from transmitting the access message may allow enough time for one or more other UEs to transition from the RRC connected state to the RRC idle state or the RRC inactive state, and as a result, enable the UE to enter the RRC connected state at a point in the future when the base station can maintain the quantity of UEs in the RRC connected state to below the threshold quantity, thereby alleviating congestion at the base station. In some such examples, the greater the quantity of UEs above the threshold quantity, the greater the likelihood of a longer delay.

Subsequently, a UE in an RRC idle state or an RRC inactive state may attempt to transition to the RRC connected state, and as such, may transmit an access message to the base station requesting to establish or resume the RRC connected state for receiving multicast broadcast services. If the base station is experiencing an overload condition when the base station receives the access message, the base station may transmit a rejection message indicating that the UE's request to establish or resume the RRC connected state is denied. By rejecting the access message from the UE when the base station is experiencing an overload condition, the base station may prevent an increased or a prolonged overload condition. Conversely, if the base station is not experiencing an overload condition (for example, due to the delay), the base station may exchange random access messages with the UE so that the UE can establish or resume the RRC connected state and receive multicast broadcast services.

Particular aspects of the subject matter described in this disclosure can be implemented to realize one or more of the following potential advantages. In some examples, the described techniques can be used to monitor or improve the reliability of providing multicast broadcast services via feedback from a group of UEs while maintaining quality of service and reducing congestion. For example, by delaying the transmission of an access request message, by a UE seeking multicast broadcast services to a base station providing the multicast broadcast services, the base station may increase the feedback for improving the reliability or quality of multicast broadcast services while preventing an overload condition. A base station may use a variety of values and parameters to dictate the state of a UE and to control access of the UE to receive multicast broadcast services. As described herein, the base station may control access of a UE for receiving multicast broadcast services by identifying whether the base station is configured for allowing UEs to camp on the base station or cell to receive the one or more multicast broadcast service. The base station may also control access of a UE for receiving multicast broadcast services by providing one or more configured access parameters to a UE to enable the UE to identify whether the UE is allowed to camp on the base station or cell to receive the one or more multicast broadcast services. In addition, the base station may control access of a UE for receiving multicast broadcast services based on one or more access control parameters that enable the UE to identify whether the UE is barred from sending an access attempt (for example, an access message) for connection setup to receive the one or more multicast broadcast services.

For example, a base station may provide the UE with one or more barring parameters and may inform the UE whether the base station is configured for providing multicast broadcast services. The UE may select a cell of the base station (for example, camp on a cell of the base station) for receiving multicast broadcast services after receiving the one or more barring parameters and identify that the base station is configured for multicast broadcast services.

The base station may also provide the UE with one or more access control parameters and may inform the UE whether the UE is permitted to establish or resume a radio resource control (RRC) connected state with the base station. The access control parameters may be associated with multicast broadcast services, one or more barring factors, and one or more barring times. By configuring the barring factors and barring times, the base station may be able to control the likelihood of how quickly the UE will be able to transmit an access message to the base station requesting an establishment of the RRC connected state or a reestablishment (for example, a resume) of the RRC connected state to receive the multicast broadcast services.

If a base station has an overload condition where a quantity of UEs, that is greater than a threshold quantity, are in a connected state with a cell of the base station, then the base station may configure a barring factor and/or a barring time to delay the UE from transmitting an access message or to increase the likelihood of delaying the transmission of the access message by the UE. Delaying the UE from transmitting the access message may allow enough time for one or more other UEs to drop off the base station and reduce the quantity of UE in the RRC connected state to a quantity below a threshold quantity alleviating congestion at the base station. In some embodiments, the greater the quantity of UEs above the threshold quantity, the greater the likelihood of a longer delay.

Subsequently, the UE may transmit an access message to the base station requesting to establish or resume the RRC connected state for receiving multicast broadcast services. If the base station has an overload condition when the base station receives the access message, the base station may transmit a rejection message indicating that the UE's request to establish or resume the RRC connected state is denied. By rejecting the access message from the UE when the base station has an overload condition, the base station may prevent an increased or a prolonged overload condition. Conversely, if the base station does not have an overload condition (for example, due to the delay), the base station may exchange random access messages with the UE for the UE to establish or resume the RRC connected state and receive multicast broadcast services. By controlling the likelihood of delaying the transmission of the access message to the base station so that the base station has time to alleviate the overload condition, the base station may more efficiently or more frequently maximize the quantity of UEs (for example, without exceeding the threshold quantity) in the connected state receiving multicast broadcast services to receive more channel quality feedback from UEs improving the reliability and quality of the multicast broadcast services.

Figure 3:
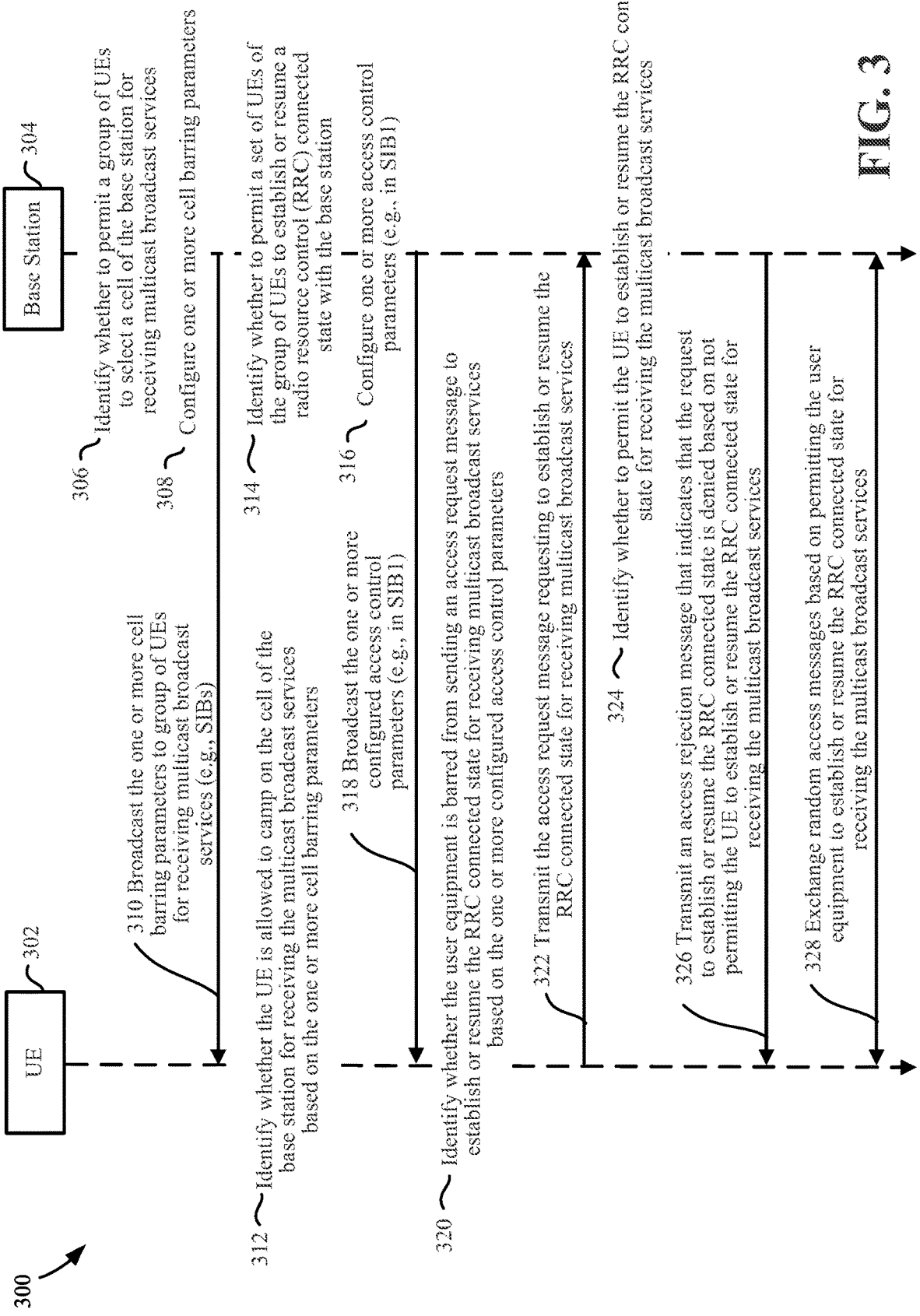
FIG. 3 is a conceptual illustration of an example wireless communication system for controlling new radio (NR) multicast and broadcast access in accordance with some aspects of the disclosure.

FIG. 3 is a conceptual illustration of an example wireless communication system 300 for controlling new radio (NR) multicast and broadcast access in accordance with some aspects of the disclosure. Wireless communication networks may include a user equipment 302 and a base station 304 and may be configured to provide one or more multicast broadcast services or one or more unicast services. In operation 306, a base station 304 may identify whether to permit a group of UEs to select a cell of the base station for receiving multicast broadcast services. The multicast broadcast services may be associated with one of a specific public land mobile network (PLMN) or all public land mobile networks. In certain embodiments, the identification of whether to permit the group of UEs to select the cell for receiving the multicast broadcast services comprises identifying whether the base station supports multicast broadcast services.

For example, the base station 304 may identify whether the base station 304 is configured for allowing the user equipment 302 to camp on the base station 304 or cell for receiving one or more multicast broadcast services. In certain embodiments, the base station 304 may identify whether the base station 304 is configured for allowing the user equipment 302 to camp on the base station 304 to receive the one or more multicast broadcast services based on whether a cellBarred-MBS field has an enable information element or a disabled information element. For example, the base station 304 may have a cellBarred-MBS field and a cellBarred field. The cellBarred-MBS field may have a disabled information element and the cellBarred field may have a disabled information element. In this case, the base station 304 may be unable to permit the user equipment 302 to camp on the base station 304 to receive access to either one or more multicast broadcast services or one or more unicast services. In certain embodiments, when the cellBarred field has a disabled information element, the base station 304 may be unable to permit the user equipment 302 to camp on the base station 304 to receive either one or more multicast broadcast services or one or more unicast services regardless of whether the cellBarred-MBS field has the enabled information element or the disabled information element.

As another example, the base station 304 may have a cellBarred-MBS field and a cellBarred field. The cellBarred-MBS field may have a disabled information element and the cellBarred field may have an enabled information. In this case, the base station 304 may be unable to permit the user equipment 302 to camp on the base station 304 to receive one or more multicast broadcast services. However, the base station 304 may be able to permit the user equipment 302 to camp on the base station 304 to receive one or more unicast services.

As yet another example, the base station 304 may have a cellBarred-MBS field and a cellBarred field. The cellBarred-MBS field may have an enabled information element and the cellBarred field may have an enabled information element. In this case, the base station 304 may be able to permit the user equipment 302 to camp on the base station 304 to receive both or either one or more multicast broadcast services or one or more unicast services.

As another example, the base station 304 may have a barred information element for the cellBarredMBS field and a false information element for a cellReservedForMBSUse field. In this case, through an SIB1 message or another SIB, the base station 304 may provide the UE with an indication of one or more other frequencies associated with the same cell where multicast broadcast services are available in order to assist the UE with finding multicast broadcast services in other frequencies. Additionally, or alternatively, through an SIB1 message or another SIB, the base station 304 may provide the UE with an identification and a frequency of a different cell (for example, a neighboring cell) where multicast broadcast services are available in order to assist the UE with finding multicast broadcast services. In certain embodiments, the base station 304 may provide UEs in an RRC connected state with an RRC release message containing redirection information redirecting UEs in the RRC connected state to other cells for receiving multicast broadcast services.

The cellBarred field as well as the cellBarred-MBS field may be independently set or transitioned between an enabled information element and a disabled information element by the base station 304 or a network supporting the base station 304. In certain embodiments, the cellBarred-MBS field may have an enabled information element or a disabled information element based on a capability of the base station 304. For example, the base station 304 may not be configured to provide a user equipment 302 with access to any multicast broadcast services, and thus, the cellBarred-MBS field may have a disabled information element. As another example, the base station 304 may be configured to provide a user equipment 302 with access to all multicast broadcast services, and thus, the cellBarred-MBS field may have an enabled information element.

In operation 308, the base station 304 may configure or generate one or more cell barring parameters. In some embodiments, the base station 304 may configure or generate one or more cell barring parameters when (for example, responsive to) the base station 304 permits a group of UEs to select a cell of the base station for receiving multicast broadcast services. For example, the base station 304 may configure or generate one or more cell barring parameters when (for example, responsive to) the base station 304 identifies that the base station 304 is configured for allowing user equipment 302 to camp on the base station 304 or cell for receiving the one or more multicast broadcast service. The one or more cell barring parameters may be sent to the user equipment 302 through a System Information Block (SIB) message (for example, a SIB Type 1 (SIB1) message) or Master Information Block (MIB). The one or more cell barring parameters may enable the user equipment 302 to identify whether the user equipment 302 is allowed to camp on the base station 304 or cell to receive the one or more multicast broadcast services.

In operation 310, the base station 304 may transmit or broadcast the one or more cell barring parameters to the group of UEs including the UE 302 for receiving the multicast broadcast services. In certain embodiments, the base station 304 may transmit or broadcast the one or more cell barring parameters to the group of UEs including the UE 302 based on whether the group of UEs is permitted to select the cell for receiving the multicast broadcast services. In certain embodiments, as described herein, the base station 304 may have configured or generated one or more cell barring parameters when (for example, responsive to) the base station 304 identifies that the base station 304 is configured for allowing the user equipment 302 to camp on the base station 304 or cell for receiving the one or more multicast broadcast service. The one or more barring parameters may be transmitted to the user equipment 302 through a System Information Block Type 1 (SIB1) or Master Information Block (MIB) message for enabling the user equipment 302 to identify whether the user equipment 302 is allowed to camp on the base station 304 or cell to receive the one or more multicast broadcast services.

For example, the base station 304 may rely on a cellBarred-MBS/cellReservedMBS Use information elements to determine that the base station 304 is configured for providing access to the one or more multicast broadcast services. The base station 304 may transmit the one or more configured cell barring parameters to the user equipment 302 as an indication to the user equipment 302 that the base station 304 is configured for providing the user equipment 302 with access to the one or more multicast broadcast services.

In operation 312, the user equipment 302 may identify whether the user equipment 302 is allowed to camp on the cell of the base station 304 for receiving the multicast broadcast services based on the one or more cell barring parameters. For example, the user equipment 302 may receive one or more cell barring parameters from a base station 304 based on whether the group of user equipment including the user equipment 302 is permitted to select a cell of the base station for receiving multicast broadcast services. After receiving the one or more cell barring parameters, the user equipment 302 may identify whether the user equipment 302 is allowed to camp on the cell of the base station 304 for receiving the multicast broadcast services.

When the user equipment 302 receives the one or more cell barring parameters information elements cellBarredMBS or cellReservedforMBSUse and if these information elements indicate that multicast broadcast services are barred, then the user equipment does not camp on the cell for receiving multicast broadcast services. If these information elements indicate that the cell is not barred for multicast broadcast services, then the user equipment (UEs) may be allowed to camp on the cell for receiving the multicast broadcast services.

For example, the base station 304 may have for transmission to the user equipment 302, for example in a System Information Block Type 1 (SIB1) message, a CellReservedforMBSUse field indicating whether the user equipment 302 is barred from camping on the cell to access the one or more multicast broadcast services. The CellReservedforMBSUse field may have an enabled information element or may have a true information element to indicate to the user equipment 302 that the user equipment 302 may be allowed to camp on the cell to receive access to one or more multicast broadcast services through the base station 304. The CellReservedforMBSUse field may have a disabled information element, a false information element, or a not true information element to indicate to the user equipment 302 that the user equipment 302 may be barred from camping on the cell to receive one or more multicast broadcast services through the base station 304.

As another example, the base station 304 may have for transmission to the user equipment 302, for example in a System Information Block Type 1 (SIB1) message, a CellReservedforMBSUse field indicating whether the user equipment 302 is barred from camping on the cell to receive the one or more multicast broadcast services and a cellBarred field indicating whether the user equipment 302 is barred from camping on the cell to receive unicast services from cell (for example, one or more unicast services) through the base station 304. In some embodiments, the CellReservedforMBSUse field may have an enabled information element or a true information element and the cellBarred field may have a not barred information element indicating together to the user equipment 302 that the user equipment 302 may be allowed to camp on the cell for receiving unicast services but not any multicast broadcast services from the cell. In this case, when the user equipment 302 receives the one or more indications, the user equipment 302 may not camp on the base station 304 and instead search for another base station to receive one or more multicast broadcast services. In some embodiments, the CellReservedforMBSUse field may have a disabled information element or a false information element and the cellBarred field may have a not barred information element indicating to the user equipment 302 that the user equipment 302 may be allowed to camp on the cell to receive both unicast and multicast broadcast services through the base station 304. In some embodiments, the CellReservedforMBSUse field may have an enabled information element or a true information element and the cellBarred field may have a barred information element indicating to the user equipment 302 that the user equipment 302 may be allowed to camp on the cell only to received multicast broadcast services and UE is not allowed to receive any type of unicast services from the base station. In this case, UEs intended to receive only multicast-broadcast services from the base station 304, may camp on the cell and UEs intended to receive unicast services may not camp on the cell and instead may look for other cells. The CellReservedforMBSUse field may be attributed to a particular public land mobile network (PLMN) among a plurality of public land mobile networks or the CellReservedforMBSUse field may be attributed to all public land mobile networks.

The base station 304 may use a system information message to provide a list of multicast broadcast services available in serving cell. The multicast broadcast service information may be provided per frequency level for the serving cell and for other neighboring cells in a same frequency or in different frequencies. A presence or an absence this new system information block may be indicated in SIB1. The user equipment 302 may consider the presence or the absence of the new SIB scheduling information in SIB1 as an implicit indication of whether the cell is supporting or not supporting any multicast broadcast services in this cell and user equipment may identify whether or not to camp on the cell.

In order to control access overload, base station may use a unified access control mechanism. The one or more access control parameters may include one or more access category parameters associated with the one or more services. Access category parameters may be used for unified access control mechanisms at the user equipment 302. Generally, during a unified access control mechanism, a user equipment 302 may receive from a base station 304 at least one of one or more access category parameters and one or more access identity parameters. The one or more access identity parameters may include an access identity value associated with the user equipment 302. An access identity value may be a value that indicates how the user equipment 302 is configured. For example, an access identity value may indicate that the user equipment 302 is configured for high priority services, mission critical services, multimedia priority services, or the like. An access identity value provides an indication of who the user equipment is.

As part of unified access control enhancement, a base station may provide a radio channel condition threshold configuration to user equipment (UEs) intended to receive multicast broadcast services in the radio resource control connected state. Radio channel condition threshold parameters of the radio channel condition threshold configuration may indicate any combinations of parameters including reference signal receive power (RSRP), reference signal receive quality (RSRQ), signal to noise ratio (SINR) based on SSB, CSI-RS reference signals, channel state information (CSI) reporting threshold, or the like. When a parameter of a channel associated with a user equipment is greater than one or more configured threshold parameters, the user equipment (UEs) may be restricted from entering to the radio resource control connected state for the purpose of receiving multicast broadcast services. Otherwise, user equipment (UEs) may be allowed enter into the radio resource control connected state for the for the purpose of receiving multicast broadcast services based on the unified access control mechanism.

In operation 314, the base station 304 may identify whether to permit a set of UEs of the group of UEs to establish or resume a radio resource control (RRC) connected state with the base station 304 for receiving the multicast broadcast services. In certain embodiments, the identification of whether to permit the user equipment (UEs) to establish or resume the RRC connected state with the base station for receiving the multicast broadcast services may be based on an overload condition at the base station and one of a received radio resource control establishment cause or a received radio resource control resume cause. In certain embodiments, the identification of whether to permit the set of UEs of the group of UEs to establish or resume the radio resource control connected state with the base station for receiving the multicast broadcast services may be based on permitting the group of UEs to select the cell for receiving the multicast broadcast services.

In operation 316, the base station 304 configures one or more access control parameters. In certain embodiments, the base station 304 may have configured or generated one or more access control parameters when (for example, responsive to) the base station 304 is configured for providing access to the one or more multicast broadcast services for the user equipment 302 in an radio resource control connected state. In certain embodiments, the base station 304 may have configured or generated one or more access control parameters when (for example, responsive to) the base station 304 permits the group of UEs to establish or resume radio resource control connection. These access control parameters may include one or more access category values and each access category may be configured with the barring factor and the barring timer. The one or more access control parameters may be transmitted to the user equipment 302 through a System Information Block Type 1 (SIB1) message to enable the user equipment 302 to identify whether the user equipment 302 is barred from sending an access attempt (for example, an access message) for connection setup to receive the one or more multicast broadcast services. In certain embodiments, the one or more access control parameters are associated with all multicast broadcast services or one or more specific multicast broadcast services.

Each of the one or more cell barring factors and each of the one or more cell barring times may be associated with at least one access category value described herein. The cell barring parameters may enable the user equipment 302 to identify whether the user equipment 302 is allowed send access attempt to the base station 304 or cell to establish or resume RRC connection for the purpose of receiving the one or more multicast broadcast services. The cell barring factors may be numbers generated by the base station 304 that are no less than zero (0) and not greater than one (1) (for example, 0.4, 0.6, 0.8). The cell barring times may be a designated or base station indicated amount of time between instances when the user equipment generates a random number for comparison with the cell barring factors as described herein. The base station 304 may include a cell barring factor and a cell barring time to maintain or limit (for example, to be below a threshold) a quantity of user equipment that may be camped on the base station 304 for receiving the one or more multicast broadcast services. Additionally, or alternatively, the base station 304 may include a cell barring factor and a cell barring time to maintain or limit (for example, to be below a threshold) a data rate of data being transmitted through the base station 304.

The base station 304 may configure or generate the one or more cell barring factors and the one or more cell barring times based on at least one of one or more quality of service (QoS) parameters associated with the one or more multicast broadcast services, a quantity of one or more user equipment receiving access to the one or more multicast broadcast services through the base station, or a data rate of data being accessed by one or more user equipment through the base station. For example, the base station 304 may generate an access category value, described herein, associated with all multicast broadcast services. The base station 304 may also identify that a quantity of user equipment camped on the base station 304 is above a threshold quantity. The base station 304 may configure a cell barring factor associated with all of the multicast broadcast services to a relatively low numerical value (for example, 0.1, 0.3) to provide the user equipment 302 with a low chance of receiving access to all of the multicast broadcast services and a high chance of being barred. In some embodiments, the base station 304 may configure the cell barring factor to be a value of zero giving the user equipment 302 no chance to access to the multicast broadcast services associated with the access category value. Additionally, or alternatively, the base station 304 may configure a cell barring time associated with all of the multicast broadcast services to be a relatively long period of time between instances when the user equipment 302 generates a random number for comparison with the cell barring factor as described herein. By giving the user equipment 302 a high chance of being barred and a long amount of time between generating random numbers, the base station 304 is provided with time to allow other user equipment to fall off the base station 304 and reduce the quantity of user equipment camped on the base station to be below a threshold quantity.

In some embodiments, the base station 304 may configure or generate one or more access control parameters when (for example, responsive to) the base station 304 is configured for providing access to the one or more multicast broadcast services for the user equipment 302 in an radio resource control connected state. Subsequently, the base station 304 may configure or generate one or more access control parameters including one or more access category values and each access category may be configured with a barring factor and a barring timer. The one or more access control parameters may be sent to the user equipment 302 through a System Information Block Type 1 (SIB1) message. The one or more access control parameters may enable the user equipment 302 to identify whether the user equipment 302 is barred from sending an access attempt (for example, an access message) for connection setup to receive the one or more multicast broadcast services.

Upon receiving access control parameters for access categories and when the user equipment establishes or resumes radio resource control connection to receive multicast broadcast services in the radio resource control connected state, user equipment may identify whether to send access attempt or not based on access category parameters (for example, a barring factor and a barring time for the access category). As part of a barring test for a given access category, the user equipment 302 may generate a random number that is no less than or greater than the access category barring factor. Subsequently, the user equipment 302 may identify that the user equipment 302 is not allowed to send an access attempt to setup or resume a radio resource control connection to receive the one or more multicast broadcast services from the base station 304. Once the user equipment 302 identifies, based on the comparison between the generated random and a cell barring factor, that the user equipment 302 is not allowed to send an access attempt associated with the access category to establish or resume RRC connection to receive the one or more multicast broadcast services from the base station 304, the user equipment initiates a timer. When the timer for this access category is running, the user equipment may not be allowed to initiate an access attempt for the same access category. After the timer expires, if the user equipment seeks to access the cell for the same access category, then the user equipment may be allowed to repeat the barring test for the same access category. If the subsequently generated random number is less than the cell barring factor, then the user equipment 302 may identify that the user equipment 302 is allowed to send an access attempt to the base station 304 or cell to receive the one or more multicast broadcast services from the base station 304 and the process stops. Otherwise, the user equipment 302 may initiate the timer again and generate yet another random number in accordance with the cell barring timer. This process may be repeated until the user equipment 302 generates a random number that is less than the cell barring factor indicating that the user equipment 302 is allowed to send an access attempt to the base station 304 or cell to receive the one or more multicast broadcast services from the base station 304 in a radio resource control connected state.

The base station 304 may generate the one or more cell barring factors and the one or more cell barring times based on at least one of one or more quality of service (QoS) parameters associated with the one or more multicast broadcast services, a quantity of one or more UEs receiving access to the one or more multicast broadcast services through the base station, or a data rate of data being accessed by one or more UEs through the base station. For example, the base station 304 may generate an access category value associated with all multicast broadcast services. The base station 304 may also identify that a quantity of user equipment that can establish a radio resource control connection to the base station 304 is above a threshold quantity. The base station 304 may configure a cell barring factor associated with all of the multicast broadcast services to a relatively low numerical value (for example, 0.1, 0.3) to provide the user equipment 302 with a low chance of receiving access to all of the multicast broadcast services and a high chance of being barred. In some embodiments, the base station 304 may configure the cell barring factor to be a value zero giving the user equipment 302 no chance to access to the multicast broadcast services. In addition, the base station 304 may configure a cell barring time associated with all of the multicast broadcast services to be a relatively long period of time. This may cause an amount of time between instances when the user equipment 302 generates a random number to extend to the relatively long period of time. By giving the user equipment 302 a high chance of being barred and a long amount of time between generating random numbers, the base station 304 may be provided with time to allow other user equipment to fall off the base station 304 and reduce the number of user equipment establish or resume RRC connection to the base station to be below a threshold number.

As another example, the base station 304 may also identify that a quality of service (QoS) associated with all the multicast broadcast services is relatively high or strong. The base station 304 may configure a cell barring factor associated with all of the multicast broadcast services to a relatively high numerical value (for example, 0.7, 0.9) to provide the user equipment 302 with a high chance of receiving access to all of the multicast broadcast services and a low chance of being barred. In some embodiments, the base station 304 may configure the access category value to be one (1) giving the user equipment access to the multicast broadcast services associated with the access category value. In some embodiments, when the access category barring factor is zero, the user equipment 302 may identify that the user equipment 302 has access to the multicast broadcast service. In addition, the base station 304 may configure a cell barring time associated with all of the multicast broadcast services to be a relatively short period of time. This may cause an amount of time between instances when the user equipment 302 generates a random number to extend to the relatively short period of time. By giving the user equipment 302 a low chance of being barred and a short amount of time between generating random numbers, the base station 304 may provide the user equipment 302 with a quick opportunity to receive access to the multicast broadcast service through the base station 304 and increase the number of user equipment connected (for example, to establish a radio resource control connection with base station) to the base station to receive the high quality of service.

After access control checking, if the user equipment is allowed to transmit an access attempt to establish or resume a radio resource control connection, the user equipment may initiate a random access (RACH) procedure. During RACH procedure, message 3 or message A may carry a radio resource control setup request message or a radio resource control resume request message. The radio resource control setup request message may include an establishment cause for a multicast broadcast service or a radio resource control resume request message may include resume cause for a multicast broadcast service. Upon receiving Message 3 or Message A containing an establishment cause/resume cause=multicast broadcast service, the base station 304 may reject connection setup or allow connection setup/resume procedure based on an overload condition. If base station 304 rejects a radio resource control connection setup or a radio resource control resume procedure, then the base station may transmit a radio resource control rejection message including a wait timer. In some embodiments, the user equipment may not be allowed to establish or resume a radio resource control connection while the wait timer is running. Once the wait time expires, the user equipment may be allowed to initiate an access attempt again and the above procedure repeats.

FIG. 4 is a table 400 illustrating an example mapping of access identity values to barring parameters for controlling multicast and broadcast access in accordance with some aspects of the disclosure. As shown in FIG. 4, the table 400 includes a plurality of access identity values and each access identity value is used to specify a device type based on a device configuration. Each of the plurality of access identity values may be a numerical value (for example, an integer value) beginning with the value zero. As part of the unified access control parameters in SIB1, each access identity can be barred or not barred by setting an associated access barring bit (for example, "1" for barring, "0" for not barring). The UE may seek to transmit an access attempt to the base station. The UE may verify whether the access attempt associated with the access identity is barred or not barred based on a barring bit value received for the access identities.

As described herein, each access identity value of the plurality of access identity values may be mapped to a user equipment configuration. As an example, a user equipment associated with access identity value one (1), may be configured for Multimedia Priority Services (MPS). As another example, a user equipment associated with access identity value two (2), may be configured for Mission Critical Services (MCS).

The one or more access category values may include one or more access category values associated with a service. An access category value may be a value that indicates what the access message is requesting. For example, an access category value may indicate that the user equipment 302 is requesting access for a paging service, an emergency call service, a Multimedia Telephony (MMTEL) voice session service, an MMTEL video session service, a real-time text service, an IP Multimedia Subsystem (IMS) messaging service, a Short Message Service (SMS), or the like. An access category value provides an indication of what the user equipment 302 does or wants to do. In certain embodiments, an access category value may be a standard value or an operator specified value. NAS may provide Radio Resource Establishment causes to be used for NAS initiated services. For radio resource control-initiated connections, radio resource control identifies what the radio resource control establishment cause is. NAS TS 24. 501, Table 4. 5. 2. 2 may specify one or more mapping tables for access categories and radio resource control establishment clauses.

FIG. 5 is a table 500 illustrating an example mapping of access category values to barring parameters for controlling multicast and broadcast access in accordance with some aspects of the disclosure. As shown in FIG. 5, the table 500 includes a plurality of access category values, a plurality of conditions related to a user equipment, and a plurality of types of access attempts. Each of the plurality of access category values may be a numerical value (for example, an integer value) beginning with the value zero. The numerical value may be a standard value or an operator specified value. The plurality of conditions related to the user equipment may be conditions related to a user equipment associated with the access category value. The plurality of type of access attempts may relate the type of service a user equipment seeks to receive access to.

Each access category value of the plurality of access category values may be mapped to a condition related to a user equipment and type of access attempt. As an example, for access category value one (1), the condition related to the user equipment providing the access category value includes that the "UE is configured for delay tolerant service and subject to access control for Access Category 1, which is judged based on relation of UE's Home Public Land Mobile Network (HPLMN) and the selected Public Land Mobile Network." As another example, for access category value three (3), the condition related to the user equipment providing the access category value includes all conditions except the conditions for access category value one (1).

Each access category value of the plurality of access category values may be mapped to a type of access attempting. As an example, for access category value one (1), the type of access attempt may indicate that an associated user equipment includes all access attempt types except for emergency services or Mobile Originated (MO) exception data. As another example, for access category value three (3), the type of access attempt may indicate that an associated user equipment includes access attempts associated with Mobile Originated signaling on a Non-access Stratum (NAS) level resulting from a service other than paging services.

In certain embodiments, each access category value of the plurality of access category values may be mapped to additional information such as a note indicating one or more other parameters. As an example, for access category value one (1), the one or more other parameters may indicate that for Access Category 1 is accompanied with information that defines whether the access category applies to user equipment with one of the following categories: (a) user equipment that are configured for delay tolerant service; (b) user equipment that are configured for delay tolerant service and are neither in their Home Public Land Mobile Network nor a Public Land Mobile Network that is equivalent to it; (c) user equipment that are configured for delay tolerant service and are neither in the Public Land Mobile Network listed as the most preferred Public Land Mobile Network of the country where the user equipment is roaming in the operator-defined Public Land Mobile Network selector list on the SIM/USIM, nor in a Home Public Land Mobile Network that is equivalent to their Home Public Land Mobile Network. When a user equipment is configured for EAB, the user equipment is also configured for delay tolerant services.

In case a user equipment is configured both for EAB and for EAB override, when the upper layer indicates to override Access Category 1, then Access Category 1 is not applicable." As another example, for access category value three (3), the barring parameter may indicate that an associated user equipment is barred from accessing Mobile Originated signaling on a Non-access Stratum (NAS) level resulting from a service other than paging services.

As an example, for access category values 32-63, the one or more other parameters may indicate that when there is an access category based on operator classification and a standard access to both of which an access attempt can be categorized, and the standardized access category is neither 0 nor 2, the user equipment applies the access category based on operator classification. When there is an access category based on an operator classification and a standardized access category, both of which an access attempt can be categorized, and the standard access category is 0 or 2, then the user equipment may apply the standard access category.

As another example, for the type of access attempt associated with access category value four (4), a Multimedia Telephony (MMTEL) voice session service may include Real-Time Text (RTT) service. As yet another example, for the type of access attempt associated with access category value seven (7) MO data that does not belong to any other access category may include IP Multimedia Subsystem messaging. As yet another example, for the type of access attempt associated with access category value nine (9) MO IP Multimedia Subsystem registration related to signaling may include data that does not belong to any other access category may include IP Multimedia Subsystem registration related to signaling such as IP Multimedia Subsystem messaging initial registration, re-registration, and subscription refresh. As an example, for access category value ten (10), the one or more other parameters may indicate that category ten applies to a node-B of Internet of Things (IoT), using node-B Internet of Things connectivity to 5GC.

Returning to FIG. 3, in certain embodiments, the one or more access control parameters may include one or more access category values associated with the one or more multicast broadcast services. When the base station 304 transmits one or more access category access control parameter values associated with one or more multicast broadcast services, the user equipment 302 may receive those access category access control parameter values and identify whether the user equipment 302 is barred from sending an access message (for example, an access attempt) for connection setup to request one or more multicast broadcast services associated with the received access category values. For example, the user equipment 302 may receive from the base station 304 an access category value indicating a video streaming multicast broadcast service. The user equipment 302 may match the received access category value with an access category value associated with the video streaming multicast broadcast service that the user equipment 302 seeks to receive and identify that the user equipment 302 is not barred by the base station 304 from transmitting an access message requesting connection setup to access the video streaming multicast broadcast service based on the matching. As discussed herein, the user equipment 302 may subsequently transmit the access message (for example, an access attempt for connection setup) to the base station 304 requesting the video streaming multicast broadcast service from the base station 304 based on the one or more received access category parameters. In certain embodiments, when the base station 304 does not include an access category value that matches an access category value associated with a multicast broadcast service that the user equipment seeks to have access to, the user equipment 302 may identify that the base station 304 is barring the user equipment 302 from sending an access message for connection setup and from receiving the multicast broadcast service and the uniform access control mechanism ends. In certain embodiments, the one or more access category values identifying all multicast broadcast services or one or more particular multicast broadcast services (for example, video streaming multicast broadcast services).

In operation 318, the base station 304 transmits or broadcasts the one or more access control parameters to the group of UEs including the UE 302 based on identifying whether to permit the set of UEs to establish or resume the RRC connected state with the base station 304 for receiving the multicast broadcast services. In operation 320, the user equipment 302 identifies whether the UE 302 is barred from transmitting an access request message to establish or resume the RRC connected state for receiving the multicast broadcast services based on the one or more access control parameters. For example, the use equipment 302 may receive the one or more access control parameters from the base station 304 based on an identification of whether to permit the user equipment 302 to establish or resume a radio resource control (RRC) connected state with the base station 304 for receiving the multicast broadcast services. After receiving the one or more access control parameters, the user equipment 302 may identifies whether the user equipment 302 is barred from transmitting an access request message to establish or resume the RRC connected state for receiving the multicast broadcast services.

In operation 322, the user equipment 302 may transmit the access request message to the base station 304 requesting to establish or resume the RRC connected state for receiving multicast broadcast services. For example, if the access attempt associated with the access category is not barred, then the UE may transmit the access request message to the base station requesting to establish or resume the RRC connected state for receiving multicast broadcast services. The base station 304 may have transmitted these access control parameters to the user equipment 302 through a System Information Block Type 1 (SIB1) message. The one or more access control parameters may have enabled the user equipment 302 to identify whether the user equipment 302 is barred from sending an access attempt (for example, an access message) for connection setup to receive the one or more multicast broadcast services. In response, the user equipment 302 may transmit an access message requesting connection setup to receive the one or more multicast broadcast services. The user equipment 302 may transmit an access message requesting setup to receive the one or more multicast broadcast services based on the one or more access control parameters. For example, the user equipment may transmit an access message to the base station 304 requesting connection setup to receive the one or more multicast broadcast services when the one or more configured access parameters do not indicate that the user equipment 302 is barred from sending an access message requesting connection setup to receive access to the one or more multicast broadcast services or when the one or more configured access parameters indicate that the user equipment 302 is not barred from sending an access message requesting connection setup to receive access to the one or more multicast broadcast services. As an example, if the user equipment 302 is not barred from transmitting an access message requesting connection setup to access the one or more multicast broadcast services (for example, as described in TS 38. 331, Section 5. 3. 14. 5: Access barring check), the user equipment 302 may send an access message such as an RRCSetupRequest message or an RRCResumeRequest message, for example, including a new cause value (for example, an access category value) associated with multicast broadcast services. The new cause value associated with the one or more multicast broadcast services may be mapped to an establish cause or a resume cause also associated with the one or more multicast broadcast services. This allows the base station 304 differentiate between user equipment trying to establish multicast broadcast and user equipment trying to establish unicast. This also allows the base station 304 to identify whether a user equipment is establishing an RRC connection for a first time to receive one or more multicast broadcast services or whether a user equipment is resuming a suspended RRC connection for receiving one or more multicast broadcast services. If the user equipment wants to establish RRC connection for unicast data, if the user equipment receives multicast broadcast data during the ongoing unicast connection, the user equipment may utilize unicast control.

In operation 324, the base station 304 may identify whether to permit the user equipment 302 to establish or resume the RRC connected state for receiving the multicast broadcast services. For example, the base station 304 may receive an access request message from the user equipment 302 of the set of UEs requesting to establish or resume the RRC connected state for receiving multicast broadcast services. After receiving the access request message, the base station 304 may identify whether to permit the user equipment 302 to establish or resume the RRC connected state for receiving the multicast broadcast services.

In certain embodiments, identifying whether to permit the set of UEs of the group of UEs to establish or resume the RRC connected state with the base station for receiving the multicast broadcast services is based on an overload condition at the base station 304. For example, the base station 304 may receive the access message and identify whether the user equipment 302 is allowed to enter the RRC connected state for receiving the multicast broadcast services. The base station 304 may identify whether the user equipment is allowed to enter the RRC connected state when too many user equipment (UEs) are camped on the cell of the base station 304, when too much data (for example, a data rate above a threshold data rate) is being communicated through the base station 304 and with the user equipment (UEs), or when a quality of service (QoS) at the base station 304 is below a threshold QoS.

As another example, reception of the access message by the base station 304 may trigger the base station 304 to evaluate one or more quality of service (QoS) parameters associated with the one or more multicast broadcast services, a quantity of one or more user equipment receiving access to the one or more multicast broadcast services through the base station compared to a threshold quantity (an overload condition), or a data rate of data being accessed by one or more user equipment through the base station 304 compared to a threshold data rate (an overload condition), to identify whether the user equipment is barred from entering the RRC connected state to access the one or more multicast broadcast services through the bae station. In some embodiments, responsive to receiving the access message, the base station 304 may identify that one or more quality of service (QoS) parameters associated with the one or more multicast broadcast services are relatively low, a quantity of one or more user equipment receiving access to the one or more multicast broadcast services through the base station is above a threshold quantity, or a data rate of data being accessed by one or more user equipment through the base station 304 is above a threshold data rate. Accordingly, the base station 304 may transmit a response message indicating that the user equipment 302 is rejected from entering the RRC connected state to receive the one or more multicast broadcast services based on the access message and subsequently bar the user equipment 302 from access to the one or more multicast broadcast services.

In certain embodiments, permitting the set of UEs of the group of UEs to establish or resume the RRC connected state with the base station 304 for receiving the multicast broadcast services is based one of a received RRC establishment cause or a received RRC resume cause included in the access message. For example, the base station 304 may receive the access message including an establishment cause and identify that the user equipment 302 is allowed to enter the RRC connected state for receiving the multicast broadcast services because a quantity of user equipment (UEs) camped on the base station 304 is below a threshold. As another example, the base station 304 may receive the access message including a resume cause and identify that the user equipment 302 is allowed to enter the RRC connected state for receiving the multicast broadcast services because the user equipment 302 temporarily lost connection and is attempted to resume connection again. In certain embodiments, when the access message includes a resume cause, the base station 304 may identify that the user equipment 302 is allowed to enter the RRC connected state for receiving the multicast broadcast services regardless of whether a quantity of user equipment (UEs) camped on the base station 304 is above a threshold.

In some embodiments, when the base station 304 does not receive the access message, for example, after a predetermined time, then the base station 304 may identify that the user equipment 302 is barred from receiving access to the one or more multicast broadcast services. Accordingly, the base station 304 may transmit a response message indicating that the user equipment 302 is not allowed to enter the RRC connected state and receive the one or more multicast broadcast services based on the access message and subsequently bar the user equipment 302 from accessing to the one or more multicast broadcast services.

In operation 326, the base station 304 may transmit an access rejection message that indicates, to the user equipment 302, that the request to establish or resume the RRC connected state is denied based on not permitting the user equipment 302 to establish or resume the RRC connected state for receiving the multicast broadcast services. For example, the base station 304 may identify whether the user equipment is allowed to enter into the RRC connected state for receiving multicast broadcast services based on access message while the base station 304 is in an overload condition. In such a case, the base station 304 may transmit an RRC rejection message to the user equipment 302 if the base station 304 rejects the RRC connection setup due to the base station overload condition.

In certain embodiments, the base station 304 may bar the user equipment from entering the RRC connected state to receive the one or more multicast broadcast services responsive to the access message indicating that the user equipment is attempting at least one of establishing access to the one or more multicast broadcast services or resuming access to the one or more multicast broadcast services. For example, the base station 304 may receive an access message from the user equipment 302 indicating that the user equipment 302 is attempting to establish access to the one or more multicast broadcast service for a first time or after a predetermined time. The base station 304 may identify that the base station 304 is not accepting new user equipment to camp on the base station 304 and receive access to the one or more multicast broadcast services. In response, the base station 304 may not allow the user equipment 302 to enter the RRC connected state to receive the one or more multicast broadcast services through the base station 304 because the user equipment 302 is attempting to establish access to the one or more multicast broadcast service for a first time or after a predetermined time.

In certain embodiments, the base station 304 may not allow the user equipment to enter the RRC connected state and receive the one or more multicast broadcast services base on a type of multicast broadcast service sought by the user equipment 302. For example, the base station 304 may prioritize a first type of multicast broadcast service over a second type of multicast broadcast service. When, for example, a quality of service is relatively high for multicast broadcast services at the base station 304, the base station 304 may permit the user equipment 302 to enter the RRC connected state to receive access to both the first type of multicast broadcast service and the second type of multicast broadcast service. However, when, for example, a quality of service is relatively low for multicast broadcast services at the base station 304, the base station 304 may permit the user equipment 302 to enter the RRC connected state to receive access to the first type of multicast broadcast service, but not allow the user equipment 302 to enter the RRC connected state to receive access to the second type of multicast broadcast service.

In operation 328, the user equipment 302 and the base station 304 may exchange random access messages based permitting the user equipment 302 to establish or resume the RRC connected state for receiving the multicast broadcast services. For example, responsive to receiving the access message, the base station 304 may identify that one or more quality of service (QoS) parameters associated with the one or more multicast broadcast services are relatively high, a quantity of one or more user equipment receiving access to the one or more multicast broadcast services through the base station is below a threshold quantity, or a data rate of data being accessed by one or more user equipment through the base station 304 is below a threshold data rate. Accordingly, the base station 304 may transmit a response message indicating that the user equipment 302 is allowed to enter the RRC connected state to receive the one or more multicast broadcast services based on the access message and subsequently allow the user equipment 302 to access to the one or more multicast broadcast services. The base station 304 and the user equipment 302 may exchange random access messages based on the base station 304 permitting the user equipment 302 to establish or resume the RRC connected state for receiving the multicast broadcast services.

As another example, the base station 304 may receive an access message from the user equipment 302 indicating that the user equipment 302 is attempting to resume access to the one or more multicast broadcast services after losing access for a relatively short period of time. The base station 304 may accept resuming user equipment to camp on the base station 304 and resume access to the one or more multicast broadcast services. In response, the base station 304 may allow the user equipment 302 to enter the RRC connected state and receive the one or more multicast broadcast services through the base station 304 because the user equipment 302 is attempting to resume access to the one or more multicast broadcast service after losing access for a relatively short period of time. The base station 304 and the user equipment 302 may exchange random access messages based on the base station 304 permitting the user equipment 302 to establish or resume the RRC connected state for receiving the multicast broadcast services.

It should be understood that the system 300 including the user equipment 302 and the base station 304 may implement any one or more procedures described herein in addition to the procedure described herein with respect to FIG. 3. For example, in addition to the system 300 implementing the one or more procedures described herein with respect to FIG. 3, the system 300 including the user equipment 302 and the base station 304 may implement any one or more procedures described herein with respect to any one or more of FIGS. 1, 2, and 6-10.

Figure 6:
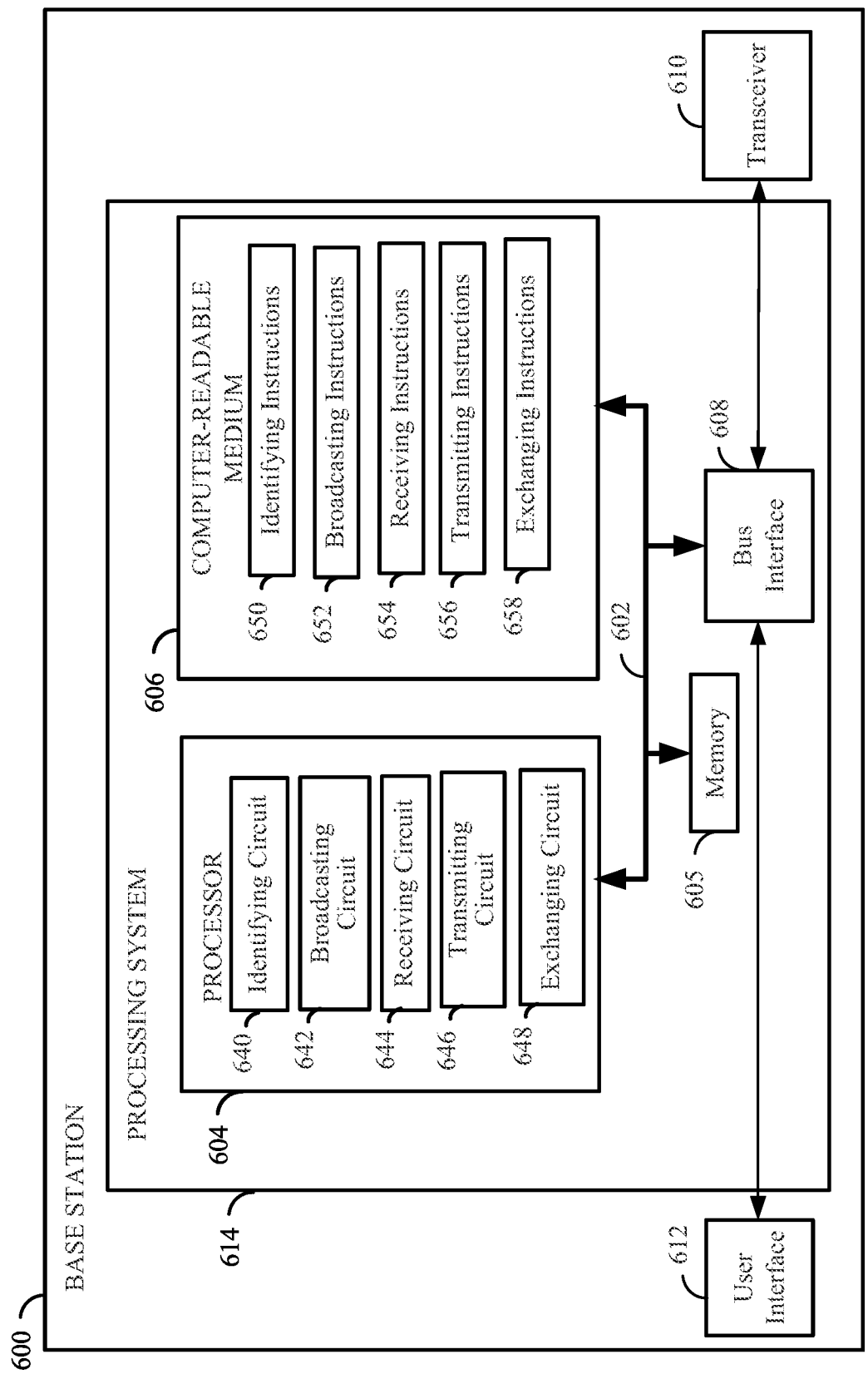
FIG. 6 is a block diagram conceptually illustrating an example hardware implementation for a base station in accordance with some aspects of the disclosure.

FIG. 6 is a block diagram conceptually illustrating an example hardware implementation for a base station 600 in accordance with some aspects of the disclosure. In some examples, the base station 600 may be a base station as illustrated in any one or more of FIGS. 1-3 and 7-10.

The base station 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 600 may be configured to perform any one or more of the functions described herein. That is, the processor 604, as utilized in the base station 600, may be used to implement any one or more of the processes and procedures described and illustrated in FIGS. 1-3 and 7-10.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 may provide a communication interface or means for wirelessly communicating with various other apparatus over a transmission medium. Depending upon the nature of the apparatus, a user interface 612 (for example, keypad, display, speaker, microphone, joystick) may also be provided.

In some aspects of the disclosure, the processor 604 may include an identifying circuit 640 configured to perform various functions, including, for example, identifying whether to permit a group of user equipment (UEs) to select a cell of the base station for receiving multicast broadcast services. Additionally, or alternatively, the identifying circuit 640 may be configured to perform various functions, including, for example, identifying whether to permit a set of one or more UEs of the group of UEs to establish or resume a radio resource control (RRC) connected state with the base station for receiving the multicast broadcast services. Additionally, or alternatively, the identifying circuit

640 may be configured to perform various functions, including, for example, identifying whether to permit the UE to establish or resume the RRC connected state for receiving the multicast broadcast services.

In some aspects of the disclosure, the processor 604 may include a broadcasting circuit 642 configured to perform various functions, including, for example, broadcasting one or more cell barring parameters to a group of user equipment (UEs) that indicate whether UEs in the group of UEs are permitted to select a cell of the base station for receiving multicast or broadcast services. Additionally, or alternatively, the broadcasting circuit 642 may be configured to perform various functions, including, for example, broadcasting one or more access control parameters to a set of one or more UEs, of the group of UEs, that are indicated to be permitted to select the cell for receiving the multicast or broadcast services based on the one or more cell barring parameters, the one or more access control parameters indicating whether the set of one or more UEs is permitted to establish or resume a radio resource control (RRC) connected state with the base station for receiving the multicast or broadcast services. Additionally, or alternatively, the broadcasting circuit 642 may be configured to perform various functions, including, for example, broadcasting the one or more access control parameters in response to receiving the access request message.

In some aspects of the disclosure, the processor 604 may include a receiving circuit 644 configured to perform various functions, including, for example, receiving an access request message from a UE of the set of one or more UEs requesting to establish or resume the RRC connected state for receiving the multicast or broadcast services. In some aspects of the disclosure, the processor 804 may include a transmitting circuit 646 configured to perform various functions, including, for example, transmitting an access rejection message that indicates, to the set of one or more UEs, that the set of one or more UEs is not permitted to establish or resume the RRC connected state for receiving the multicast or broadcast services. In some embodiments, the transmitting circuit 646 may perform one or more functions of the broadcasting circuit 642. In some aspects of the disclosure, the processor 604 may include an exchanging circuit 648 configured to perform various functions, including, for example, exchanging random access messages with the set of one or more UEs when the one or more access control parameters indicate that the set of one or more UEs is permitted to establish or resume the RRC connected state for receiving the multicast or broadcast services. In some embodiments, the receiving circuit 644 or the transmitting circuit 646 may perform one or more functions of the exchanging circuit 648.

The processor 604 may be responsible for managing the bus 602 and general processing, including the execution of software stored on the computer-readable medium 606. The software, when executed by the processor 604, causes the processing system 614 to perform the various functions described herein, including those functions describe with respect to FIGS. 1-3 and 7-10. The computer-readable medium 606 and the memory 605 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (for example, hard disk, floppy disk, magnetic strip), an optical disk (for example, a compact disc (CD) or a digital versatile disc (DVD)), a smart card, a flash memory device (for example, a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 606 may include identifying software or instructions 650, broadcasting software or instructions 652, receiving software or instructions 654, transmitting software or instructions 656, or exchanging software or instructions 658. Of course, in the examples provided herein, the circuitry included in the processor 604 is merely provided as an example, and other means for carrying out the described functions may be included within various aspects of the present disclosure, including but not limited to the instructions stored in the computer-readable storage medium 606, or any other suitable apparatus or means described in any one of the FIGS. 1-3 and 7-10 and utilizing, for example, the processes or algorithms described herein.

Figure 7:
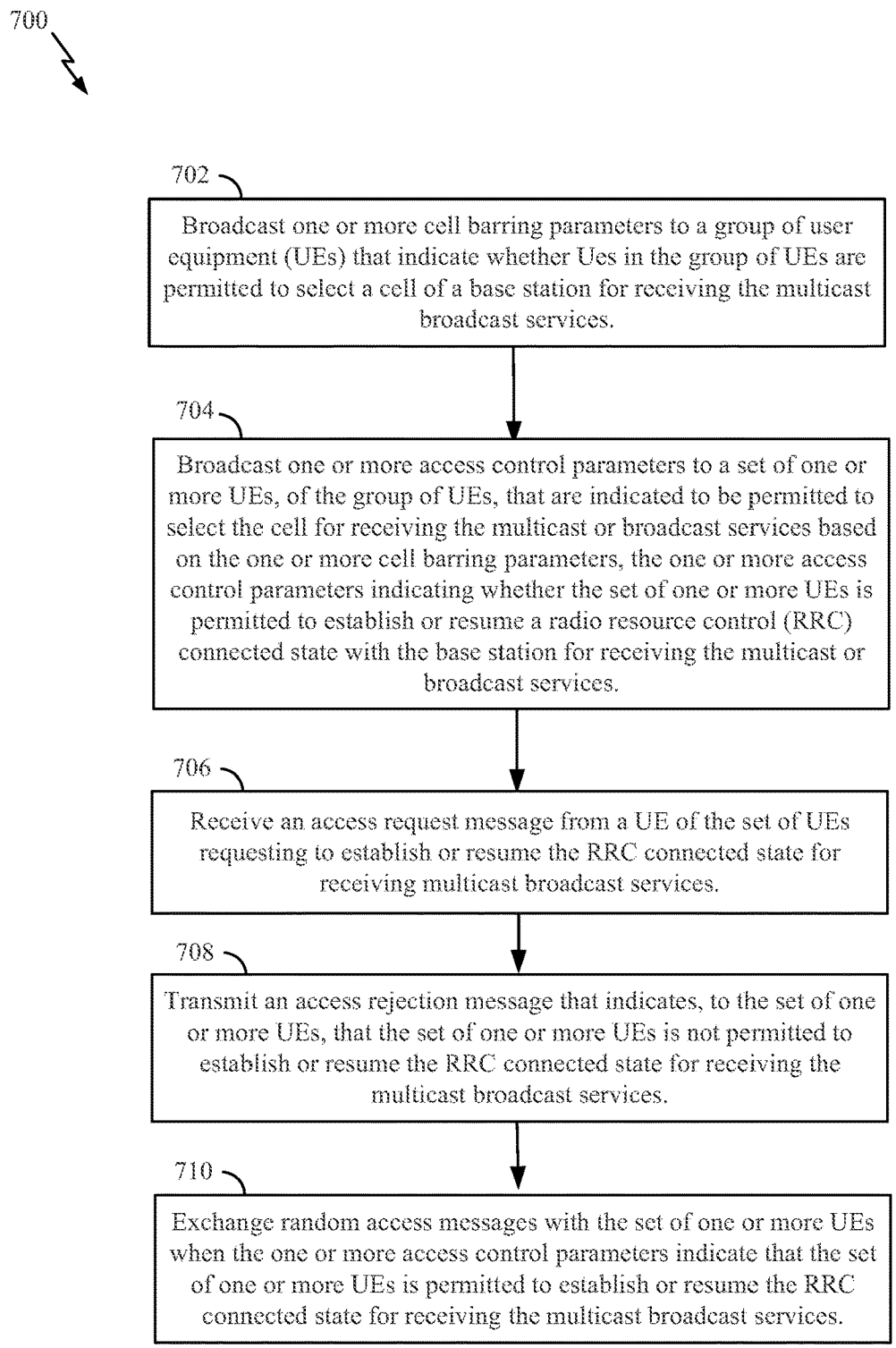
FIG. 7 is a flow chart illustrating an example method performed at a base station for controlling multicast and broadcast access in accordance with some aspects of the disclosure.

FIG. 7 is a flow chart illustrating an example method 700 performed at a base station for controlling multicast and broadcast access in accordance with some aspects of the disclosure. In some examples, the method 700 may be carried out by any suitable apparatus or means for carrying out the functions or algorithm described herein.

At block 702, the base station may broadcast one or more cell barring parameters to a group of user equipment (UEs) that indicate whether UEs in the group of UEs are permitted to select a cell of the base station for receiving multicast or broadcast services. This may be used by the base station to provide a base station status. The multicast broadcast services may be associated with one of a specific public land mobile network (PLMN) or all public land mobile networks. In certain embodiments, identifying whether to permit the group of UEs to select the cell for receiving the multicast broadcast services comprises identifying whether the base station supports multicast broadcast services.

For example, the base station may be configured for allowing the user equipment to camp on the base station or cell for receiving one or more multicast broadcast services. In certain embodiments, the base station may be configured for allowing the user equipment to camp on the base station to receive the one or more multicast broadcast services based on whether a cellBarred-MBS field has an enable information element or a disabled information element. For example, the base station may have a cellBarred-MBS field and a cellBarred field. The cellBarred-MBS field may have a disabled information element and the cellBarred field may have a disabled information element. In this case, the base station may be unable to permit the user equipment to camp on the base station to receive access to either one or more multicast broadcast services or one or more unicast services. In certain embodiments, when the cellBarred field has a disabled information element, the base station may be unable to permit the user equipment to camp on the base station to receive either one or more multicast broadcast services or one or more unicast services regardless of whether the cellBarred-MBS field has the enabled information element or the disabled information element.

As another example, the base station may have a cellBarred-MBS field and a cellBarred field. The cellBarred-MBS field may have a disabled information element and the cellBarred field may have an enabled information. In this case, the base station may be unable to permit the user equipment to camp on the base station to receive one or more multicast broadcast services. However, the base station may be able to permit the user equipment to camp on the base station to receive one or more unicast services.

As yet another example, the base station may have a cellBarred-MBS field and a cellBarred field. The cellBarred-MBS field may have an enabled information element and the cellBarred field may have an enabled information element. In this case, the base station may be able to permit the user equipment to camp on the base station to receive both or either one or more multicast broadcast services or one or more unicast services.

As another example, the base station 304 may have a barred information element for the cellBarredMBS field and a false information element for a cellReservedForMBSUse field. In this case, through an SIB1 message or another SIB, the base station 304 may provide the UE with an indication of one or more other frequencies associated with the same cell where multicast broadcast services are available in order to assist the UE with finding multicast broadcast services in other frequencies. Additionally, or alternatively, through an SIB1 message or another SIB, the base station 304 may provide the UE with an identification and a frequency of a different cell (for example, a neighboring cell) where multicast broadcast services are available in order to assist the UE with finding multicast broadcast services. In certain embodiments, the base station 304 may provide UEs in an RRC connected state with an RRC release message containing redirection information redirecting UEs in the RRC connected state to other cells for receiving multicast broadcast services.

The cellBarred field as well as the cellBarred-MBS field may be independently set or transitioned between an enabled information element and a disabled information element by the base station or a network supporting the base station. In certain embodiments, the cellBarred-MBS field may have an enabled information element or a disabled information element based on a capability of the base station. For example, the base station may not be configured to provide a user equipment with access to any multicast broadcast services, and thus, the cellBarred-MBS field may have a disabled information element. As another example, the base station may be configured to provide a user equipment with access to all multicast broadcast services, and thus, the cellBarred-MBS field may have an enabled information element.

In certain embodiments, permitting a group of user equipment (UEs) to select a cell of the base station for receiving multicast broadcast services may cause the base station to configure or generate one or more cell barring parameters. In some embodiments, the base station may configure or generate one or more cell barring parameters when (for example, responsive to) the base station may permit a group of UEs to select a cell of the base station for receiving multicast broadcast services. For example, the base station may configure or generate one or more cell barring parameters when (for example, responsive to) the base station is configured for allowing user equipment to camp on the base station or cell for receiving the one or more multicast broadcast service. The one or more cell barring parameters may be sent to the user equipment through a System Information Block (SIB) message (for example, a SIB Type 1 (SIB1) message) or Master Information Block (MIB). The one or more cell barring parameters may enable the user equipment to identify whether the user equipment is allowed to camp on the base station or cell to receive the one or more multicast broadcast services.

In certain embodiments, the base station may transmit or broadcast the one or more cell barring parameters to the group of UEs including the UE based on identifying whether to permit the group of UEs to select the cell for receiving the multicast broadcast services. In certain embodiments, as described herein, the base station may have configured or generated one or more cell barring parameters when (for example, responsive to) the base station is configured for allowing the user equipment to camp on the base station or cell for receiving the one or more multicast broadcast service. The one or more barring parameters may be transmitted to the user equipment through a System Information Block Type 1 (SIB1) or Master Information Block (MIB) message for enabling the user equipment to identify whether the user equipment is allowed to camp on the base station or cell to receive the one or more multicast broadcast services.

For example, the base station may rely on a cellBarred-MBS/cellReservedMBSUse information elements to identify that the base station is configured for providing access to the one or more multicast broadcast services. The base station may transmit the one or more configured cell barring parameters to the user equipment as an indication to the user equipment that the base station is configured for providing the user equipment with access to the one or more multicast broadcast services.

At block 704, the base station may broadcast one or more access control parameters to a set of one or more UEs, of the group of UEs, that are indicated to be permitted to select the cell for receiving the multicast or broadcast services based on the one or more cell barring parameters, the one or more access control parameters indicating whether the set of one or more UEs is permitted to establish or resume a radio resource control (RRC) connected state with the base station for receiving the multicast or broadcast services. For example, the base station may identify whether to permit the set of one or more UEs to establish or resume the RRC connected state with the base station for receiving the multicast broadcast services based on an overload condition at the base station and one of a received radio resource control establishment cause or a received radio resource control resume cause. In certain embodiments, the base station may identify whether to permit the set of one or more UEs of the group of UEs to establish or resume the radio resource control connected state with the base station for receiving the multicast broadcast services based permitting the group of UEs to receive the multicast broadcast services in the RRC connected state. In certain embodiments, permitting the group of UEs to receive the multicast broadcast services may be based on an overload condition at the base station.

In certain embodiments, the base station may have configured or generated one or more access control parameters when (for example, responsive to) the base station is configured for providing access to the one or more multicast broadcast services for the user equipment in an radio resource control connected state. In certain embodiments, the base station may have configured or generated one or more access control parameters when (for example, responsive to) the base station permits the group of UEs to establish or resume radio resource control connection. These access control parameters may include one or more access category values and each access category may be configured with the barring factor and the barring timer. The one or more access control parameters may be transmitted to the user equipment through a System Information Block Type 1 (SIB1) message to enable the user equipment to identify whether the user equipment is barred from sending an access attempt (for example, an access message) for connection setup to receive the one or more multicast broadcast services. In certain embodiments, the one or more access control parameters are associated with all multicast broadcast services or one or more specific multicast broadcast services.

Each of the one or more cell barring factors and each of the one or more cell barring times may be associated with at least one access category value described herein. The cell barring parameters may enable the user equipment to identify whether the user equipment is allowed to camp on the base station or cell to receive the one or more multicast broadcast services. The cell barring factors may be numbers generated by the base station that are no less than zero (0) and not greater than one (1) (for example, 0.4, 0.6, 0.8). The cell barring times may be a designated or base station provided amount of time between instances when the user equipment generates a random number for comparison with the cell barring factors as described herein. The base station may include a cell barring factor and a cell barring time to maintain or limit (for example, to be below a threshold) a quantity of user equipment that may be camped on the base station for receiving the one or more multicast broadcast services. Additionally, or alternatively, the base station may include a cell barring factor and a cell barring time to maintain or limit (for example, to be below a threshold) a data rate of data being transmitted through the base station.

The base station may configure or generate the one or more cell barring factors and the one or more cell barring times based on at least one of one or more quality of service (QoS) parameters associated with the one or more multicast broadcast services, a quantity of one or more user equipment receiving access to the one or more multicast broadcast services through the base station, or a data rate of data being accessed by one or more user equipment through the base station. For example, the base station may generate an access category value, described herein, associated with all multicast broadcast services. The base station may also identify that a quantity of user equipment camped on the base station is above a threshold quantity. The base station may configure a cell barring factor associated with all of the multicast broadcast services to a relatively low numerical value (for example, 0.1, 0.3) to provide the user equipment with a low chance of receiving access to all of the multicast broadcast services and a high chance of being barred. In some embodiments, the base station may configure the cell barring factor to be a value of zero giving the user equipment no chance to access to the multicast broadcast services associated with the access category value. Additionally, or alternatively, the base station may configure a cell barring time associated with all of the multicast broadcast services to be a relatively long period of time between instances when the user equipment generates a random number for comparison with the cell barring factor as described herein. By giving the user equipment a high chance of being barred and a long amount of time between generating random numbers, the base station is provided with time to allow other user equipment to fall off the base station and reduce the quantity of user equipment camped on the base station to be below a threshold quantity.

In some embodiments, the base station may configure or generate one or more access control parameters when (for example, responsive to) the base station is configured for providing access to the one or more multicast broadcast services for the user equipment in an radio resource control connected state. Subsequently, the base station may configure or generate one or more access control parameters including one or more access category values and each access category may be configured with a barring factor and a barring timer. The one or more access control parameters may be sent to the user equipment through a System Information Block Type 1 (SIB1) message. The one or more access control parameters may enable the user equipment to identify whether the user equipment is barred from sending an access attempt (for example, an access message) for connection setup to receive the one or more multicast broadcast services.

Upon receiving access control parameters for access categories and when the user equipment establishes or resumes radio resource control connection to receive multicast broadcast services in the radio resource control connected state, user equipment may identify whether to send access attempt or not based on access category parameters (for example, a barring factor and a barring time for the access category). As part of a barring test for a given access category, the user equipment may generate a random number that is no less than or greater than the access category barring factor. Subsequently, the user equipment may identify that the user equipment is not allowed to send an access attempt to setup or resume a radio resource control connection to receive the one or more multicast broadcast services from the base station. Once the user equipment identifies based on the comparison between the generated random and a cell barring factor that the user equipment is not allowed to send an access attempt associated with the access category to establish or resume RRC connection to receive the one or more multicast broadcast services from the base station, the user equipment initiates a timer. When the timer for this access category is running, the user equipment may not be allowed to initiate an access attempt for the same access category. After the timer expires, if the user equipment seeks to access the cell for the same access category, then the user equipment may be allowed to repeat the barring test for the same access category. If the subsequently generated random number is less than the cell barring factor, then the user equipment may be allowed to send an access attempt to the base station or cell to receive the one or more multicast broadcast services from the base station and the process stops. Otherwise, the user equipment may initiate the timer again and generate yet another random number in accordance with the cell barring timer. This process may be repeated until the user equipment generates a random number that is less than the cell barring factor indicating that the user equipment is allowed to send an access attempt to the base station or cell to receive the one or more multicast broadcast services from the base station in a radio resource control connected state.

The base station may generate the one or more cell barring factors and the one or more cell barring times based on at least one of one or more quality of service (QoS) parameters associated with the one or more multicast broadcast services, a quantity of one or more UEs receiving access to the one or more multicast broadcast services through the base station, or a data rate of data being accessed by one or more UEs through the base station. For example, the base station may generate an access category value associated with all multicast broadcast services. The base station may also identify that a quantity of user equipment that can establish a radio resource control connection to the base station is above a threshold quantity. The base station may configure a cell barring factor associated with all of the multicast broadcast services to a relatively low numerical value (for example, 0.1, 0.3) to provide the user equipment with a low chance of receiving access to all of the multicast broadcast services and a high chance of being barred. In some embodiments, the base station may configure the cell barring factor to be a value zero giving the user equipment no chance to access to the multicast broadcast services. In addition, the base station may configure a cell barring time associated with all of the multicast broadcast services to be a relatively long period of time. This may cause an amount of time between instances when the user equipment generates a random number to extend to the relatively long period of time. By giving the user equipment a high chance of being barred and a long amount of time between generating random numbers, the base station may be provided with time to allow other user equipment to fall off the base station and reduce the number of user equipment establish or resume RRC connection to the base station to be below a threshold number.

As another example, the base station may also identify that a quality of service (QoS) associated with all the multicast broadcast services is relatively high or strong. The base station may configure a cell barring factor associated with all of the multicast broadcast services to a relatively high numerical value (for example, 0.7, 0.9) to provide the user equipment with a high chance of receiving access to all of the multicast broadcast services and a low chance of being barred. In some embodiments, the base station may configure the access category value to be one (1) giving the user equipment access to the multicast broadcast services associated with the access category value. In some embodiments, when the access category barring factor is zero, the user equipment may have access to the multicast broadcast service. In addition, the base station may configure a cell barring time associated with all of the multicast broadcast services to be a relatively short period of time. This may cause an amount of time between instances when the user equipment generates a random number to extend to the relatively short period of time. By giving the user equipment a low chance of being barred and a short amount of time between generating random numbers, the base station may provide the user equipment with a quick opportunity to receive access to the multicast broadcast service through the base station and increase the number of user equipment connected (for example, to establish a radio resource control connection with base station) to the base station to receive the high quality of service.

After access control checking, if the user equipment is allowed to transmit an access attempt to establish or resume a radio resource control connection, the user equipment may initiate a random access (RACH) procedure. During RACH procedure, message 3 or message A may carry a radio resource control setup request message or a radio resource control resume request message. The radio resource control setup request message may include an establishment cause for a multicast broadcast service or a radio resource control resume request message may include resume cause for a multicast broadcast service. Upon receiving Message 3 or Message A containing an establishment cause/resume cause=multicast broadcast service, the base station may reject a connection setup or allow connection setup/resume procedure based on an overload condition. If base station rejects a radio resource control connection setup or a radio resource control resume procedure, then the base station may transmit a radio resource control rejection message including a wait timer. In some embodiments, the user equipment may not be allowed to establish or resume a radio resource control connection while the wait timer is running Once the wait time expires, the user equipment may be allowed to initiate an access attempt again and the above procedure repeats.

FIG. 4 is a table 400 illustrating an example mapping of access identity values to barring parameters for controlling multicast and broadcast access in accordance with some aspects of the disclosure. As shown in FIG. 4, the table 400 includes a plurality of access identity values and each access identity value is used to specify a device type based on a device configuration. Each of the plurality of access identity values may be a numerical value (for example, an integer value) beginning with the value zero. As part of the unified access control parameters in SIB1, each access identity can be barred or not barred by setting an associated access barring bit (for example, "1" for barring, "0" for not barring). The UE may seek to transmit an access attempt to the base station. The UE may verify whether the access attempt associated with the access identity is barred or not barred based on a barring bit value received for the access identities.

As described herein, each access identity value of the plurality of access identity values may be mapped to a user equipment configuration. As an example, a user equipment associated with access identity value one (1), may be configured for Multimedia Priority Services (MPS). As another example, a user equipment associated with access identity value two (2), may be configured for Mission Critical Services (MCS).

The one or more access category values may include one or more access category values associated with a service. An access category value may be a value that indicates what the access message is requesting. For example, an access category value may indicate that the user equipment is requesting access for a paging service, an emergency call service, a Multimedia Telephony (MMTEL) voice session service, an MMTEL video session service, a real-time text service, an IP Multimedia Subsystem (IMS) messaging service, a Short Message Service (SMS), or the like. An access category value provides an indication of what the user equipment does or wants to do. In certain embodiments, an access category value may be a standard value or an operator specified value. NAS may provide Radio Resource Establishment causes to be used for NAS initiated services. For radio resource control-initiated connections, radio resource control may identify what the radio resource control establishment cause is. NAS TS 24. 501, Table 4. 5. 2. 2 may specify one or more mapping tables for access categories and radio resource control establishment clauses.

FIG. 5 is a table 500 illustrating an example mapping of access category values to barring parameters for controlling multicast and broadcast access in accordance with some aspects of the disclosure. As shown in FIG. 5, the table 500 includes a plurality of access category values, a plurality of conditions related to a user equipment, and a plurality of types of access attempts. Each of the plurality of access category values may be a numerical value (for example, an integer value) beginning with the value zero. The numerical value may be a standard value or an operator specified value. The plurality of conditions related to the user equipment may be conditions related to a user equipment associated with the access category value. The plurality of type of access attempts may relate the type of service a user equipment seeks to receive access to.

Each access category value of the plurality of access category values may be mapped to a condition related to a user equipment and type of access attempt. As an example, for access category value one (1), the condition related to the user equipment providing the access category value includes that the "UE is configured for delay tolerant service and subject to access control for Access Category 1, which is judged based on relation of UE's Home Public Land Mobile Network (HPLMN) and the selected Public Land Mobile Network." As another example, for access category value three (3), the condition related to the user equipment providing the access category value includes all conditions except the conditions for access category value one (1).

Each access category value of the plurality of access category values may be mapped to a type of access attempting. As an example, for access category value one (1), the type of access attempt may indicate that an associated user equipment includes all access attempt types except for emergency services or Mobile Originated (MO) exception data. As another example, for access category value three (3), the type of access attempt may indicate that an associated user equipment includes access attempts associated with Mobile Originated signaling on a Non-access Stratum (NAS) level resulting from a service other than paging services.

In certain embodiments, each access category value of the plurality of access category values may be mapped to additional information such as a note indicating one or more other parameters. As an example, for access category value one (1), the one or more other parameters may indicate that for Access Category 1 is accompanied with information that defines whether the access category applies to user equipment with one of the following categories: (a) user equipment that are configured for delay tolerant service; (b) user equipment that are configured for delay tolerant service and are neither in their Home Public Land Mobile Network nor a Public Land Mobile Network that is equivalent to it; (c) user equipment that are configured for delay tolerant service and are neither in the Public Land Mobile Network listed as the most preferred Public Land Mobile Network of the country where the user equipment is roaming in the operator-defined Public Land Mobile Network selector list on the SIM/USIM, nor in a Home Public Land Mobile Network that is equivalent to their Home Public Land Mobile Network. When a user equipment is configured for EAB, the user equipment is also configured for delay tolerant services. In case a user equipment is configured both for EAB and for EAB override, when the upper layer indicates to override Access Category 1, then Access Category 1 is not applicable." As another example, for access category value three (3), the barring parameter may indicate that an associated user equipment is barred from accessing Mobile Originated signaling on a Non-access Stratum (NAS) level resulting from a service other than paging services.

As an example, for access category values 32-63, the one or more other parameters may indicate that when there is an access category based on operator classification and a standard access to both of which an access attempt can be categorized, and the standardized access category is neither 0 nor 2, the user equipment applies the access category based on operator classification. When there is an access category based on an operator classification and a standardized access category, both of which an access attempt can be categorized, and the standard access category is 0 or 2, then the user equipment may apply the standard access category.

As another example, for the type of access attempt associated with access category value four (4), a Multimedia Telephony (MMTEL) voice session service may include Real-Time Text (RTT) service. As yet another example, for the type of access attempt associated with access category value seven (7) MO data that does not belong to any other access category may include IP Multimedia Subsystem messaging. As yet another example, for the type of access attempt associated with access category value nine (9) MO IP Multimedia Subsystem registration related to signaling may include data that does not belong to any other access category may include IP Multimedia Subsystem registration related to signaling such as IP Multimedia Subsystem messaging initial registration, re-registration, and subscription refresh. As an example, for access category value ten (10), the one or more other parameters may indicate that category ten applies to a node-B of Internet of Things (IoT), using node-B Internet of Things connectivity to 5GC.

As described herein, the one or more access control parameters may include one or more access category values associated with the one or more multicast broadcast services. When the base station transmits one or more access category access control parameter values associated with one or more multicast broadcast services, the user equipment may receive those access category access control parameter values and identify whether the user equipment is barred from sending an access message (for example, an access attempt) for connection setup to request one or more multicast broadcast services associated with the received access category values. For example, the user equipment may receive from the base station an access category value indicating a video streaming multicast broadcast service. The user equipment may match the received access category value with an access category value associated with the video streaming multicast broadcast service that the user equipment seeks to receive and identifies that the user equipment is not barred by the base station from transmitting an access message requesting connection setup to access the video streaming multicast broadcast service based on the matching. As discussed herein, the user equipment may subsequently transmit the access message (for example, an access attempt for connection setup) to the base station requesting the video streaming multicast broadcast service from the base station based on the one or more received access category parameters. In certain embodiments, when the base station does not include an access category value that matches an access category value associated with a multicast broadcast service that the user equipment seeks to have access to, the user equipment may identify that the base station is barring the user equipment from sending an access message for connection setup and from receiving the multicast broadcast service and the uniform access control mechanism ends. In certain embodiments, the one or more access category values identifying all multicast broadcast services or one or more particular multicast broadcast services (for example, video streaming multicast broadcast services). In some aspects, the base station may broadcast one or more access control parameters to the group of UEs based on identifying whether to permit the set of UEs to establish or resume the RRC connected state with the base station for receiving the multicast broadcast services.

At block 706, the base station may receive an access request message from a UE of the set of one or more UEs requesting to establish or resume the RRC connected state for receiving the multicast or broadcast services. In some aspects, the base station may receive an access request message from a UE of the set of one or more UEs requesting to establish or resume the RRC connected state for receiving the multicast or broadcast services and broadcast the one or more access control parameters in response to receiving the access request message. In some aspects, the base station may permit the UE to establish or resume the RRC connected state for receiving the multicast broadcast services. For example, the base station may receive an access request message from the user equipment of the set of UEs requesting to establish or resume the RRC connected state for receiving multicast broadcast services. After receiving the access request message, the base station may identify whether to permit the user equipment to establish or resume the RRC connected state for receiving the multicast broadcast services.

In certain embodiments, identifying whether to permit the set of UEs of the group of UEs to establish or resume the RRC connected state with the base station for receiving the multicast broadcast services may be based on an overload condition at the base station. For example, the base station may receive the access message and identify whether the user equipment is allowed to enter the RRC connected state for receiving the multicast broadcast services. The base station may identify that the user equipment is not allowed to enter the RRC connected state when too many user equipment (UEs) are camped on the cell of the base station, when too much data (for example, a data rate above a threshold data rate) is being communicated through the base station and with the user equipment (UEs), or when a quality of service (QoS) at the base station is below a threshold QoS.

As another example, reception of the access message by the base station may triggered the base station to evaluate one or more quality of service (QoS) parameters associated with the one or more multicast broadcast services, a quantity of one or more user equipment receiving access to the one or more multicast broadcast services through the base station compared to a threshold quantity (an overload condition), or a data rate of data being accessed by one or more user equipment through the base station compared to a threshold data rate (an overload condition), to identify whether the user equipment is barred from entering the RRC connected state to access the one or more multicast broadcast services through the bae station. In some embodiments, responsive to receiving the access message, the base station may identify that one or more quality of service (QoS) parameters associated with the one or more multicast broadcast services are relatively low, a quantity of one or more user equipment receiving access to the one or more multicast broadcast services through the base station is above a threshold quantity, or a data rate of data being accessed by one or more user equipment through the base station is above a threshold data rate. Accordingly, the base station may transmit a response message indicating that the user equipment is rejected from entering the RRC connected state to receive the one or more multicast broadcast services based on the access message and subsequently bar the user equipment from access to the one or more multicast broadcast services.

In certain embodiments, identifying whether to permit the set of UEs of the group of UEs to establish or resume the RRC connected state with the base station for receiving the multicast broadcast services may be based on of a received RRC establishment cause or a received RRC resume cause included in the access message. For example, the base station may receive the access message including an establishment cause and identify that the user equipment is allowed to enter the RRC connected state for receiving the multicast broadcast services because a quantity of user equipment (UEs) camped on the base station is below a threshold. As another example, the base station may receive the access message including a resume cause and identify that the user equipment is allowed to enter the RRC connected state for receiving the multicast broadcast services because the user equipment temporarily lost connection and is attempted to resume connection again. In certain embodiments, when the access message includes a resume cause, the base station may identify that the user equipment is allowed to enter the RRC connected state for receiving the multicast broadcast services regardless of whether a quantity of user equipment (UEs) camped on the base station is above a threshold.

In some embodiments, when the base station does not receive the access message, for example, after a predetermined time, then the base station may identify that the user equipment is barred from receiving access to the one or more multicast broadcast services. Accordingly, the base station may transmit a response message indicating that the user equipment is not allowed to enter the RRC connected state and receive the one or more multicast broadcast services based on the access message and subsequently bar the user equipment from accessing to the one or more multicast broadcast services.

At block 708, the base station may an access rejection message that indicates, to the set of one or more UEs, that the set of one or more UEs is not permitted to establish or resume the RRC connected state for receiving the multicast or broadcast services. For example, the base station may identify whether the user equipment is allowed to enter into the RRC connected state for receiving multicast broadcast services based on access message while the base station is in an overload condition. In such a case, the base station may transmit an RRC rejection message to the user equipment if the base station rejects the RRC connection setup due to the base station overload condition.

In certain embodiments, the base station may bar the user equipment from entering the RRC connected state to receive the one or more multicast broadcast services responsive to the access message indicating that the user equipment is attempting at least one of establishing access to the one or more multicast broadcast services or resuming access to the one or more multicast broadcast services. For example, the base station may receive an access message from the user equipment indicating that the user equipment is attempting to establish access to the one or more multicast broadcast service for a first time or after a predetermined time. The base station may not be accepting new user equipment to camp on the base station and receive access to the one or more multicast broadcast services. In response, the base station may not allow the user equipment to enter the RRC connected state to receive the one or more multicast broadcast services through the base station because the user equipment is attempting to establish access to the one or more multicast broadcast service for a first time or after a predetermined time.

In certain embodiments, the base station may not allow the user equipment to enter the RRC connected state and receive the one or more multicast broadcast services base on a type of multicast broadcast service sought by the user equipment. For example, the base station may prioritize a first type of multicast broadcast service over a second type of multicast broadcast service. When, for example, a quality of service is relatively high for multicast broadcast services at the base station, the base station may permit the user equipment to enter the RRC connected state to receive access to both the first type of multicast broadcast service and the second type of multicast broadcast service. However, when, for example, a quality of service is relatively low for multicast broadcast services at the base station, the base station may permit the user equipment to enter the RRC connected state to receive access to the first type of multicast broadcast service, but not allow the user equipment to enter the RRC connected state to receive access to the second type of multicast broadcast service.

At block 710, the base station may exchange random access messages with the set of one or more UEs when the one or more access control parameters indicate that the set of one or more UEs is permitted to establish or resume the RRC connected state for receiving the multicast or broadcast services. For example, responsive to receiving the access message, the base station may identify that one or more quality of service (QoS) parameters associated with the one or more multicast broadcast services are relatively high, a quantity of one or more user equipment receiving access to the one or more multicast broadcast services through the base station is below a threshold quantity, or a data rate of data being accessed by one or more user equipment through the base station is below a threshold data rate. Accordingly, the base station may transmit a response message indicating that the user equipment is allowed to enter the RRC connected state to receive the one or more multicast broadcast services based on the access message and subsequently allow the user equipment to access to the one or more multicast broadcast services. The base station and the user equipment may exchange random access messages based on the base station permitting the user equipment to establish or resume the RRC connected state for receiving the multicast broadcast services.

As another example, the base station may receive an access message from the user equipment indicating that the user equipment is attempting to resume access to the one or more multicast broadcast service after losing access for a relatively short period of time. The base station may be accepting resuming user equipment to camp on the base station and resume access to the one or more multicast broadcast services. In response, the base station may allow the user equipment to enter the RRC connected state and receive the one or more multicast broadcast services through the base station because the user equipment is attempting to resume access to the one or more multicast broadcast service after losing access for a relatively short period of time. The base station and the user equipment may exchange random access messages based on the base station permits the user equipment to establish or resume the RRC connected state for receiving the multicast broadcast services.

Figure 8:
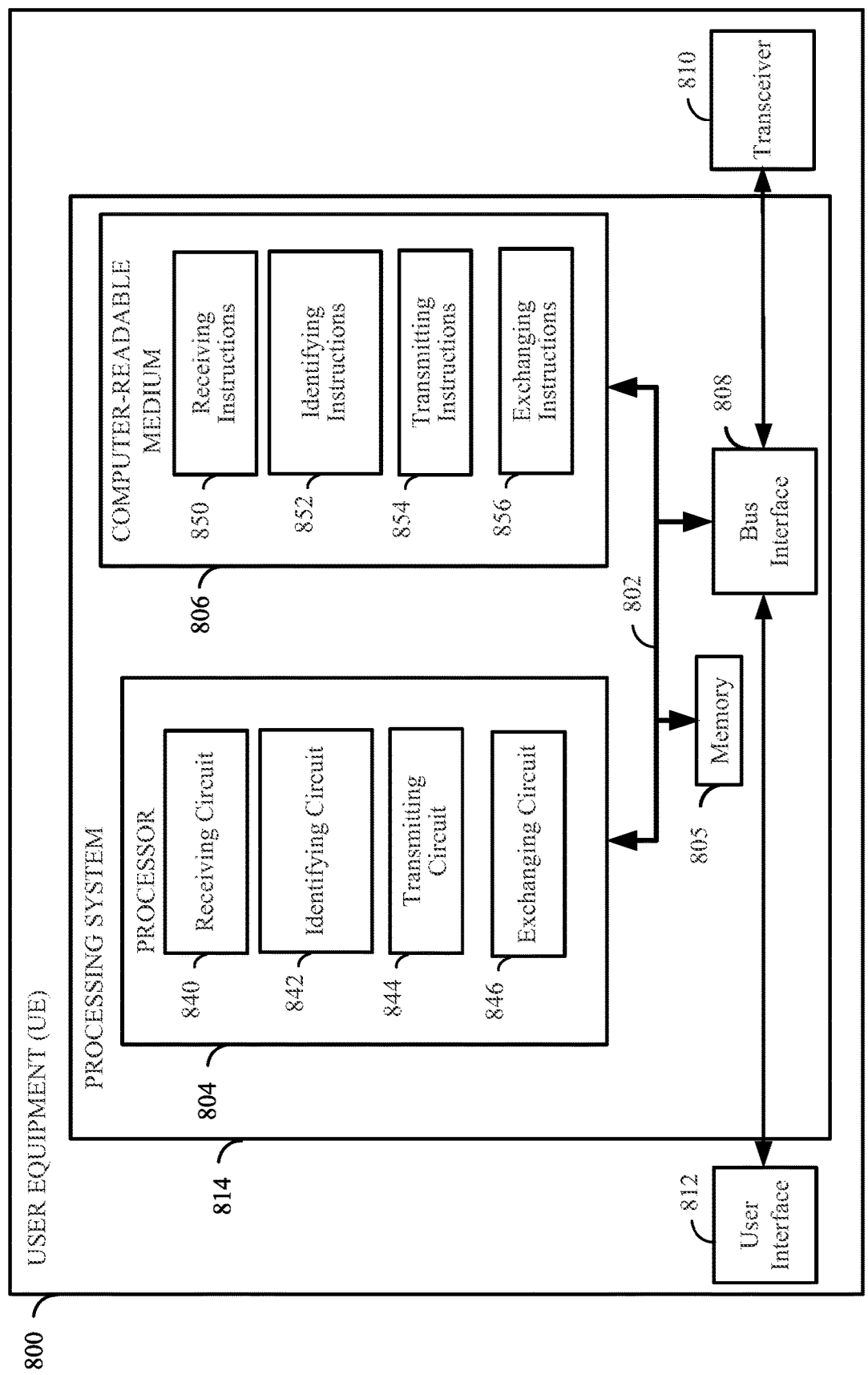
FIG. 8 is a conceptual diagram illustrating an example of a hardware implementation for an example user equipment (UE) in accordance with some aspects of the disclosure.

FIG. 8 is a conceptual diagram illustrating an example of a hardware implementation for an example user equipment (UE) 800 in accordance with some aspects of the disclosure. For example, the user equipment 800 may perform any of the functions illustrated and described in FIGS. 1-3, 6, 7, 9, and 10.

The user equipment 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the user equipment 800 may be configured to perform any one or more of the functions described herein. That is, the processor 804, as utilized in the user equipment 800, may be used to implement any one or more of the processes and procedures described in FIGS. 1-3, 6, 7, 9, and 10 and further illustrated in the flow diagrams discussed herein.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (for example, keypad, display, speaker, microphone, joystick) may also be provided.

In some aspects of the disclosure, the processor 804 may include a receiving circuit 840 configured for various functions, including, for example, receiving one or more cell barring parameters from a base station indicating whether the UE is permitted to select a cell of the base station for receiving multicast or broadcast services. The receiving circuit 840 may also be configured for various functions, including, for example, receiving one or more access control parameters from the base station indicating whether the UE is permitted to establish or resume a radio resource control (RRC) connected state with the base station for receiving the multicast or broadcast services based on the one or more cell barring parameters indicating that the UE is permitted to select the cell of the base station for receiving multicast or broadcast services. The receiving circuit 840 may further be configured for various functions, including, for example, receiving an access rejection message from the base station that indicates that the UE is not permitted to establish or resume the RRC connected state for receiving the multicast or broadcast services.

In some aspects of the disclosure, the processor 804 may include an identifying circuit 842 configured for various functions, including, for example, identifying whether the UE is allowed to camp on the cell of the base station for receiving the multicast broadcast services based on the one or more cell barring parameters. The identifying circuit 842 may also be configured for various functions, including, for example, identifying whether the UE is barred from transmitting an access request message to establish or resume the RRC connected state for receiving the multicast broadcast services based on the one or more access control parameters.

In some aspects of the disclosure, the processor 804 may include a transmitting circuit 844 configured for various functions, including, for example, transmitting an access request message to establish or resume the RRC connected state with the base station for receiving the multicast or broadcast services based on the one or more access control parameters. In some aspects of the disclosure, the processor 804 may include an exchanging circuit 846 configured for various functions, including, for example, exchanging random access messages with the base station based on the one or more access control parameters indicating that the UE is permitted to establish or resume the RRC connected state for receiving the multicast or broadcast services. In some embodiments, the receiving circuit 840 or the transmitting circuit 842 may configured to perform one or more functions of the exchanging circuit 846.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (for example, hard disk, floppy disk, magnetic strip), an optical disk (for example, a compact disc (CD) or a digital versatile disc (DVD)), a smart card, a flash memory device (for example, a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 806 may include receiving software or instructions 850, identifying software or instructions 852, transmitting software or instructions 854, or exchanging software or instructions 856. Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1-3, 6, 7, 9, and 10 and utilizing, for example, the processes or algorithms described herein.

Figure 9:
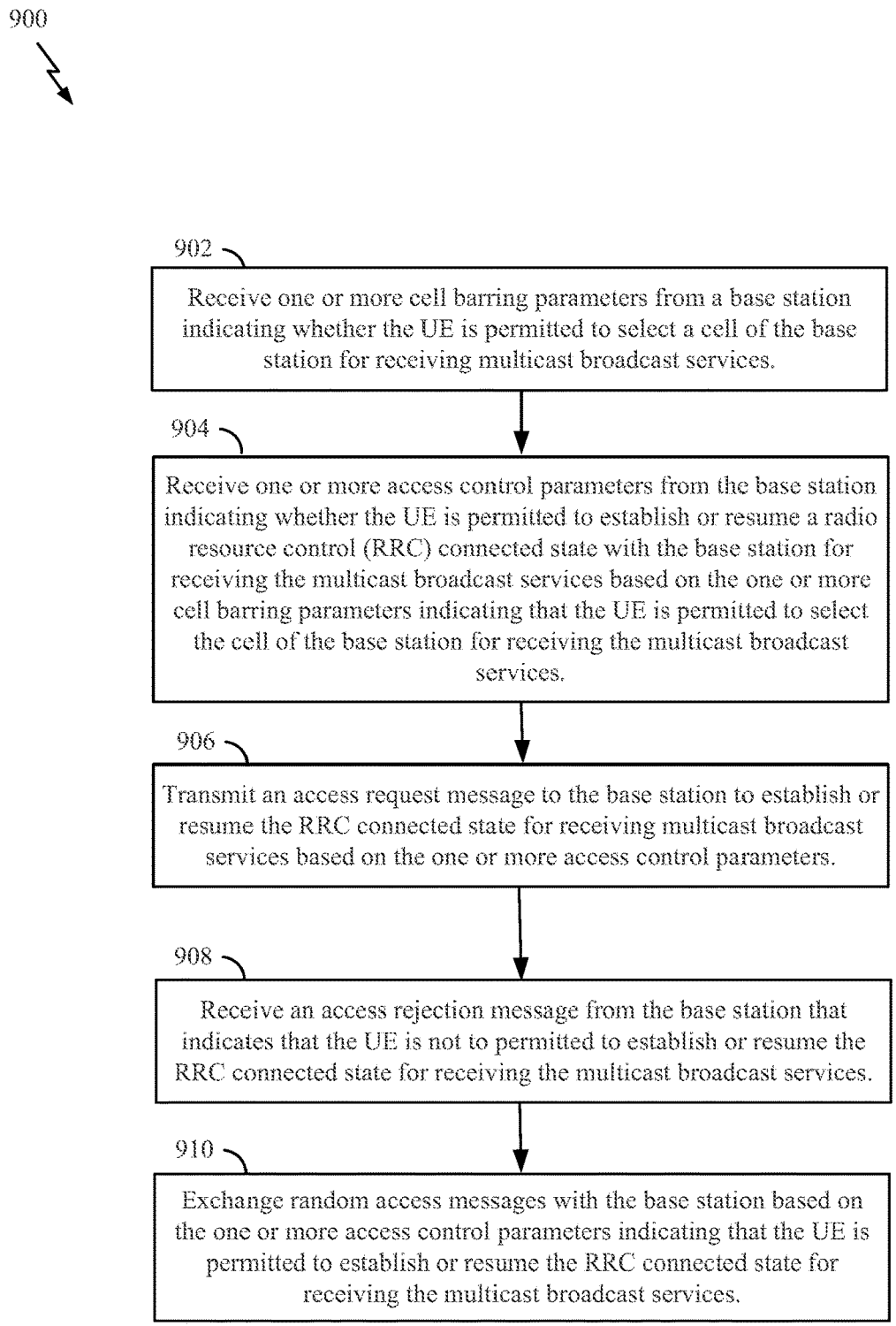
FIG. 9 is a flow chart illustrating an example method performed at a UE for controlling multicast and broadcast access in accordance with some aspects of the disclosure.

FIG. 9 is a flow chart illustrating an example method 900 performed at a UE for controlling multicast and broadcast access in accordance with some aspects of the disclosure. In some examples, the method 900 may be carried out by any suitable apparatus or means for carrying out the functions or algorithm described herein.

At block 902, the user equipment may receive one or more cell barring parameters from a base station based on a whether to permit the UE to select a cell of the base station for receiving multicast broadcast services. For example, the base station may identify whether the base station is configured for allowing the user equipment to camp on the base station or cell for receiving one or more multicast broadcast services. In certain embodiments, the base station may identify whether the base station is configured for allowing the user equipment to camp on the base station to receive the one or more multicast broadcast services based on whether a cellBarred-MBS field has an enable information element or a disabled information element. For example, the base station may have a cellBarred-MBS field and a cellBarred field. The cellBarred-MBS field may have a disabled information element and the cellBarred field may have a disabled information element. In this case, the base station may be unable to permit the user equipment to camp on the base station to receive access to either one or more multicast broadcast services or one or more unicast services. In certain embodiments, when the cellBarred field has a disabled information element, the base station may be unable to permit the user equipment to camp on the base station to receive either one or more multicast broadcast services or one or more unicast services regardless of whether the cellBarred-MBS field has the enabled information element or the disabled information element.

As another example, the base station may have a cellBarred-MBS field and a cellBarred field. The cellBarred-MBS field may have a disabled information element and the cellBarred field may have an enabled information. In this case, the base station may be unable to permit the user equipment to camp on the base station to receive one or more multicast broadcast services. However, the base station may be able to permit the user equipment to camp on the base station to receive one or more unicast services.

As yet another example, the base station may have a cellBarred-MBS field and a cellBarred field. The cellBarred-MBS field may have an enabled information element and the cellBarred field may have an enabled information element. In this case, the base station may be able to permit the user equipment to camp on the base station to receive both or either one or more multicast broadcast services or one or more unicast services.

As another example, the base station 304 may have a barred information element for the cellBarredMBS field and a false information element for a cellReservedForMBSUse field. In this case, through an SIB1 message or another SIB, the base station 304 may provide the UE with an indication of one or more other frequencies associated with the same cell where multicast broadcast services are available in order to assist the UE with finding multicast broadcast services in other frequencies. Additionally, or alternatively, through an SIB1 message or another SIB, the base station 304 may provide the UE with an identification and a frequency of a different cell (for example, a neighboring cell) where multicast broadcast services are available in order to assist the UE with finding multicast broadcast services. In certain embodiments, the base station 304 may provide UEs in an RRC connected state with an RRC release message containing redirection information redirecting UEs in the RRC connected state to other cells for receiving multicast broadcast services.

The cellBarred field as well as the cellBarred-MBS field may be independently set or transitioned between an enabled information element and a disabled information element by the base station or a network supporting the base station. In certain embodiments, the cellBarred-MBS field may have an enabled information element or a disabled information element based on a capability of the base station. For example, the base station may not be configured to provide a user equipment with access to any multicast broadcast services, and thus, the cellBarred-MBS field may have a disabled information element. As another example, the base station may be configured to provide a user equipment with access to all multicast broadcast services, and thus, the cellBarred-MBS field may have an enabled information element.

In certain embodiments, the base station may have configured or generated one or more cell barring parameters. In some embodiments, the base station may have configured or generated one or more cell barring parameters when (for example, responsive to) the base station permits a group of UEs to select a cell of the base station for receiving multicast broadcast services. For example, the base station may have configured or generated one or more cell barring parameters when (for example, responsive to) the base station is configured for allowing user equipment to camp on the base station or cell for receiving the one or more multicast broadcast service. The one or more cell barring parameters may be sent to the user equipment through a System Information Block (SIB) message (for example, a SIB Type 1 (SIB1) message) or Master Information Block (MIB). The one or more cell barring parameters may enable the user equipment to identify whether the user equipment is allowed to camp on the base station or cell to receive the one or more multicast broadcast services.

Subsequently, the base station may have transmitted or broadcasted the one or more cell barring parameters to the group of UEs including the UE for receiving the multicast broadcast services. In certain embodiments, the base station may have transmitted or broadcasted the one or more cell barring parameters to the group of UEs including the UE based on identifying whether to permit the group of UEs to select the cell for receiving the multicast broadcast services. In certain embodiments, as described herein, the base station may have configured or generated one or more cell barring parameters when (for example, responsive to) the base station is configured for allowing the user equipment to camp on the base station or cell for receiving the one or more multicast broadcast service. The one or more barring parameters may be transmitted to the user equipment through a System Information Block Type 1 (SIB1) or Master Information Block (MIB) message for enabling the user equipment is allowed to camp on the base station or cell to receive the one or more multicast broadcast services.

For example, the base station may rely on a cellBarred-MBS/cellReservedMBSUse information elements to identify that the base station is configured for providing access to the one or more multicast broadcast services. The base station may transmit the one or more configured cell barring parameters to the user equipment as an indication to the user equipment that the base station is configured for providing the user equipment with access to the one or more multicast broadcast services.

In some aspects, the user equipment may identify whether the UE is allowed to camp on the cell of the base station for receiving the multicast broadcast services based on the one or more cell barring parameters. For example, the user equipment may receive one or more cell barring parameters from a base station based on identifying whether to permit the group of user equipment including the user equipment to select a cell of the base station for receiving multicast broadcast services. After receiving the one or more cell barring parameters, the user equipment may identify whether the user equipment is allowed to camp on the cell of the base station for receiving the multicast broadcast services.

When the user equipment receives the one or more cell barring parameters information elements cellBarredMBS or cellReservedforMBSUse and if these information elements indicate that multicast broadcast services are barred, then the user equipment does not camp on the cell for receiving multicast broadcast services. If these information elements indicate that the cell is not barred for multicast broadcast services, then the user equipment (UEs) may be allowed to camp on the cell for receiving the multicast broadcast services.

For example, the base station may have for transmission to the user equipment, for example in a System Information Block Type 1 (SIB1) message, a CellReservedforMBSUse field indicating whether the user equipment is barred from camping on the cell to access the one or more multicast broadcast services. The CellReservedforMBSUse field may have an enabled information element or may have a true information element to indicate to the user equipment that the user equipment may be allowed to camp on the cell to receive access to one or more multicast broadcast services through the base station. The CellReservedforMBSUse field may have a disabled information element, a false information element, or a not true information element to indicate to the user equipment that the user equipment may be barred from camping on the cell to receive one or more multicast broadcast services through the base station.

As another example, the base station may have for transmission to the user equipment, for example in a System Information Block Type 1 (SIB1) message, a CellReservedforMBSUse field indicating whether the user equipment is barred from camping on the cell to receive the one or more multicast broadcast services and a cellBarred field indicating whether the user equipment is barred from camping on the cell to receive unicast services from cell. (for example, one or more unicast services) through the base station. In some embodiments, the CellReservedforMBSUse field may have an enabled information element or a true information element and the cellBarred field may have a not barred information element indicating together to the user equipment that the user equipment may be allowed to camp on the cell for receiving unicast services but not any multicast broadcast services from the cell. In this case, when the user equipment receives the one or more indications, the user equipment may not camp on the base station and instead search for another base station to receive one or more multicast broadcast services. In some embodiments, the CellReservedforMBSUse field may have a disabled information element or a false information element and the cellBarred field may have a not barred information element indicating to the user equipment that the user equipment may be allowed to camp on the cell to receive both unicast and multicast broadcast services through the base station. In some embodiments, the CellReservedforMBSUse field may have an enabled information element or a true information element and the cellBarred field may have a barred information element indicating to the user equipment that the user equipment may be allowed to camp on the cell only to received multicast broadcast services and UE is not allowed to receive any type of unicast services from the base station. In this case, UEs intended to receive only multicast-broadcast services from the base station, may camp on the cell and UEs intended to receive unicast services may not camp on the cell and instead may look for other cells. The CellReservedforMBSUse field may be attributed to a particular public land mobile network (PLMN) among a plurality of public land mobile networks or the CellReservedforMBSUse field may be attributed to all public land mobile networks.

The base station may use a system information message to provide a list of multicast broadcast services available in serving cell. The multicast broadcast service information may be provided per frequency level for the serving cell and for other neighboring cells in a same frequency or in different frequencies. A presence or an absence this new system information block may be indicated in SIB1. The user equipment may consider the presence or the absence of the new SIB scheduling information in SIB1 as an implicit indication of whether the cell is supporting or not supporting any multicast broadcast services in this cell and user equipment may identify whether or not to camp on the cell.

In order to control access overload, base station may use a unified access control mechanism. The one or more access control parameters may include one or more access category parameters associated with the one or more services. Access category parameters may be used for unified access control mechanisms at the user equipment. Generally, during a unified access control mechanism, a user equipment may receive from a base station at least one of one or more access category parameters and one or more access identity parameters. The one or more access identity parameters may include an access identity value associated with the user equipment. An access identity value may be a value that indicates how the user equipment is configured. For example, an access identity value may indicate that the user equipment is configured for high priority services, mission critical services, multimedia priority services, or the like. An access identity value provides an indication of who the user equipment is.

As part of unified access control enhancement, a base station may provide a radio channel condition threshold configuration to user equipment (UEs) intended to receive multicast broadcast services in the radio resource control connected state. Radio channel condition threshold parameters of the radio channel condition threshold configuration may indicate any combinations of parameters including reference signal receive power (RSRP), reference signal receive quality (RSRQ), signal to noise ratio (SINR) based on SSB, CSI-RS reference signals, channel state information (CSI) reporting threshold, or the like. When a parameter of a channel associated with a user equipment is greater than one or more configured threshold parameters, the user equipment (UEs) may be restricted from entering to the radio resource control connected state for the purpose of receiving multicast broadcast services. Otherwise, user equipment (UEs) may be allowed enter into the radio resource control connected state for the for the purpose of receiving multicast broadcast services based on the unified access control mechanism.

At block 904, the user equipment may receive one or more access control parameters from the base station indicating whether the UE is permitted to establish or resume a radio resource control (RRC) connected state with the base station for receiving the multicast or broadcast services based on the one or more cell barring parameters indicating that the UE is permitted to select the cell of the base station for receiving multicast or broadcast services. For example, the base station may have identified whether to permit a set of UEs of the group of UEs to establish or resume a radio resource control (RRC) connected state with the base station for receiving the multicast broadcast services. In certain embodiments, identifying whether to permit the user equipment (UEs) to establish or resume the RRC connected state with the base station for receiving the multicast broadcast services may be based on an overload condition at the base station and one of a received radio resource control establishment cause or a received radio resource control resume cause. In certain embodiments, identifying whether to permit the set of UEs of the group of UEs to establish or resume the radio resource control connected state with the base station for receiving the multicast broadcast services may be based on permitting the group of UEs to receive the multicast broadcast services in the RRC connected state. In certain embodiments, permitting the group of UEs to receive the multicast broadcast services may be based on an overload condition at the base station.

The base station may have also configured one or more access control parameters. In certain embodiments, the base station may have configured or generated one or more access control parameters when (for example, responsive to) the base station is configured for providing access to the one or more multicast broadcast services for the user equipment in an radio resource control connected state. In certain embodiments, the base station may have configured or generated one or more access control parameters when (for example, responsive to) the base station permits the group of UEs to establish or resume radio resource control connection. These access control parameters may include one or more access category values and each access category may be configured with the barring factor and the barring timer. The one or more access control parameters may be transmitted to the user equipment through a System Information Block Type 1 (SIB1) message to enable the user equipment to identify whether the user equipment is barred from sending an access attempt (for example, an access message) for connection setup to receive the one or more multicast broadcast services. In certain embodiments, the one or more access control parameters are associated with all multicast broadcast services or one or more specific multicast broadcast services.

Each of the one or more cell barring factors and each of the one or more cell barring times may be associated with at least one access category value described herein. The cell barring factors may be numbers generated by the base station that are no less than zero (0) and not greater than one (1) (for example, 0.4, 0.6, 0.8). The cell barring times may be a designated or base station provided amount of time between instances when the user equipment generates a random number for comparison with the cell barring factors as described herein. The base station may include a cell barring factor and a cell barring time to maintain or limit (for example, to be below a threshold) a quantity of user equipment that may be camped on the base station for receiving the one or more multicast broadcast services. Additionally, or alternatively, the base station may have included a cell barring factor and a cell barring time to maintain or limit (for example, to be below a threshold) a data rate of data being transmitted through the base station.

The base station may have configured or generated the one or more cell barring factors and the one or more cell barring times based on at least one of one or more quality of service (QoS) parameters associated with the one or more multicast broadcast services, a quantity of one or more user equipment receiving access to the one or more multicast broadcast services through the base station, or a data rate of data being accessed by one or more user equipment through the base station. For example, the base station may have generated an access category value, described herein, associated with all multicast broadcast services. The base station may have also identified that a quantity of user equipment camped on the base station is above a threshold quantity. The base station may have configured a cell barring factor associated with all of the multicast broadcast services to a relatively low numerical value (for example, 0.1, 0.3) to provide the user equipment with a low chance of receiving access to all of the multicast broadcast services and a high chance of being barred. In some embodiments, the base station may configure the cell barring factor to be a value of zero giving the user equipment no chance to access to the multicast broadcast services associated with the access category value. Additionally, or alternatively, the base station may have configured a cell barring time associated with all of the multicast broadcast services to be a relatively long period of time between instances when the user equipment generates a random number for comparison with the cell barring factor as described herein. By giving the user equipment a high chance of being barred and a long amount of time between generating random numbers, the base station is provided with time to allow other user equipment to fall off the base station and reduce the quantity of user equipment camped on the base station to be below a threshold quantity.

In some embodiments, the base station may have configured or generated one or more access control parameters when (for example, responsive to) the base station is configured for providing access to the one or more multicast broadcast services for the user equipment in an radio resource control connected state. Subsequently, the base station may configure or generate one or more access control parameters including one or more access category values and each access category may be configured with a barring factor and a barring timer. The one or more access control parameters may be sent to the user equipment through a System Information Block Type 1 (SIB1) message. The one or more access control parameters may enable the user equipment to identify whether the user equipment is barred from sending an access attempt (for example, an access message) for connection setup to receive the one or more multicast broadcast services.

Upon receiving access control parameters for access categories and when the user equipment establishes or resumes radio resource control connection to receive multicast broadcast services in the radio resource control connected state, user equipment may identify whether to send access attempt or not based on access category parameters (for example, a barring factor and a barring time for the access category). As part of a barring test for a given access category, the user equipment may generate a random number that is no less than or greater than the access category barring factor. Subsequently, the user equipment may identify that the user equipment is not allowed to send an access attempt to setup or resume a radio resource control connection to receive the one or more multicast broadcast services from the base station. Once the user equipment identifies, based on the comparison between the generated random and a cell barring factor, that the user equipment is not allowed to send an access attempt associated with the access category to establish or resume RRC connection to receive the one or more multicast broadcast services from the base station, the user equipment initiates a timer. When the timer for this access category is running, the user equipment may not be allowed to initiate an access attempt for the same access category. After the timer expires, if the user equipment seeks to access the cell for the same access category, then the user equipment may be allowed to repeat the barring test for the same access category. If the subsequently generated random number is less than the cell barring factor, then the user equipment may be allowed to send an access attempt to the base station or cell to receive the one or more multicast broadcast services from the base station and the process stops. Otherwise, the user equipment may initiate the timer again and generate yet another random number in accordance with the cell barring timer. This process may be repeated until the user equipment generates a random number that is less than the cell barring factor indicating that the user equipment is allowed to send an access attempt to the base station or cell to receive the one or more multicast broadcast services from the base station in a radio resource control connected state.

In certain embodiments, the base station may have generated the one or more cell barring factors and the one or more cell barring times based on at least one of one or more quality of service (QoS) parameters associated with the one or more multicast broadcast services, a quantity of one or more UEs receiving access to the one or more multicast broadcast services through the base station, or a data rate of data being accessed by one or more UEs through the base station. For example, the base station may have generated an access category value associated with all multicast broadcast services. The base station may have also identified that a quantity of user equipment that can establish a radio resource control connection to the base station is above a threshold quantity. The base station may have configured a cell barring factor associated with all of the multicast broadcast services to a relatively low numerical value (for example, 0.1, 0.3) to provide the user equipment with a low chance of receiving access to all of the multicast broadcast services and a high chance of being barred. In some embodiments, the base station may have configured the cell barring factor to be a value zero giving the user equipment no chance to access to the multicast broadcast services. In addition, the base station may have configured a cell barring time associated with all of the multicast broadcast services to be a relatively long period of time. This may cause an amount of time between instances when the user equipment generates a random number to extend to the relatively long period of time. By giving the user equipment a high chance of being barred and a long amount of time between generating random numbers, the base station may be provided with time to allow other user equipment to fall off the base station and reduce the number of user equipment establish or resume RRC connection to the base station to be below a threshold number.

As another example, the base station may have also identified that a quality of service (QoS) associated with all the multicast broadcast services is relatively high or strong. The base station may have configured a cell barring factor associated with all of the multicast broadcast services to a relatively high numerical value (for example, 0.7, 0.9) to provide the user equipment with a high chance of receiving access to all of the multicast broadcast services and a low chance of being barred. In some embodiments, the base station may configure the access category value to be one (1) giving the user equipment access to the multicast broadcast services associated with the access category value. In some embodiments, when the access category barring factor is zero, the user equipment may identify that the user equipment has access to the multicast broadcast service. In addition, the base station may configure a cell barring time associated with all of the multicast broadcast services to be a relatively short period of time. This may cause an amount of time between instances when the user equipment generates a random number to extend to the relatively short period of time. By giving the user equipment a low chance of being barred and a short amount of time between generating random numbers, the base station may provide the user equipment with a quick opportunity to receive access to the multicast broadcast service through the base station and increase the number of user equipment connected (for example, to establish a radio resource control connection with base station) to the base station to receive the high quality of service.

After access control checking, if the user equipment is allowed to transmit an access attempt to establish or resume a radio resource control connection, the user equipment may initiate a random access (RACH) procedure. During RACH procedure, message 3 or message A may carry a radio resource control setup request message or a radio resource control resume request message. The radio resource control setup request message may include an establishment cause for a multicast broadcast service or a radio resource control resume request message may include resume cause for a multicast broadcast service. Upon receiving Message 3 or Message A containing an establishment cause/resume cause=multicast broadcast service, the base station may reject connection setup or allow connection setup/resume procedure based on an overload condition. If base station rejects a radio resource control connection setup or a radio resource control resume procedure, then the base station may transmit a radio resource control rejection message including a wait timer. In some embodiments, the user equipment may not be allowed to establish or resume a radio resource control connection while the wait timer is running Once the wait time expires, the user equipment may be allowed to initiate an access attempt again and the above procedure repeats.

FIG. 4 is a table 400 illustrating an example mapping of access identity values to barring parameters for controlling multicast and broadcast access in accordance with some aspects of the disclosure. As shown in FIG. 4, the table 400 includes a plurality of access identity values and each access identity value is used to specify a device type based on a device configuration. Each of the plurality of access identity values may be a numerical value (for example, an integer value) beginning with the value zero. As part of the unified access control parameters in SIB1, each access identity can be barred or not barred by setting an associated access barring bit (for example, "1" for barring, "0" for not barring). The UE may seek to transmit an access attempt to the base station. The UE may verify whether the access attempt associated with the access identity is barred or not barred based on a barring bit value received for the access identities.

As described herein, each access identity value of the plurality of access identity values may be mapped to a user equipment configuration. As an example, a user equipment associated with access identity value one (1), may be configured for Multimedia Priority Services (MPS). As another example, a user equipment associated with access identity value two (2), may be configured for Mission Critical Services (MCS).

The one or more access category values may include one or more access category values associated with a service. An access category value may be a value that indicates what the access message is requesting. For example, an access category value may indicate that the user equipment is requesting access for a paging service, an emergency call service, a Multimedia Telephony (MMTEL) voice session service, an MMTEL video session service, a real-time text service, an IP Multimedia Subsystem (IMS) messaging service, a Short Message Service (SMS), or the like. An access category value provides an indication of what the user equipment does or wants to do. In certain embodiments, an access category value may be a standard value or an operator specified value. NAS may provide Radio Resource Establishment causes to be used for NAS initiated services. For radio resource control-initiated connections, radio resource control identifies what the radio resource control establishment cause is. NAS TS 24. 501, Table 4.5. 2.2 may specify one or more mapping tables for access categories and radio resource control establishment clauses.

FIG. 5 is a table 500 illustrating an example mapping of access category values to barring parameters for controlling multicast and broadcast access in accordance with some aspects of the disclosure. As shown in FIG. 5, the table 500 includes a plurality of access category values, a plurality of conditions related to a user equipment, and a plurality of types of access attempts. Each of the plurality of access category values may be a numerical value (for example, an integer value) beginning with the value zero. The numerical value may be a standard value or an operator specified value. The plurality of conditions related to the user equipment may be conditions related to a user equipment associated with the access category value. The plurality of type of access attempts may relate the type of service a user equipment seeks to receive access to.

Each access category value of the plurality of access category values may be mapped to a condition related to a user equipment and type of access attempt. As an example, for access category value one (1), the condition related to the user equipment providing the access category value includes that the "UE is configured for delay tolerant service and subject to access control for Access Category 1, which is judged based on relation of UE's Home Public Land Mobile Network (HPLMN) and the selected Public Land Mobile Network." As another example, for access category value three (3), the condition related to the user equipment providing the access category value includes all conditions except the conditions for access category value one (1).

Each access category value of the plurality of access category values may be mapped to a type of access attempting. As an example, for access category value one (1), the type of access attempt may indicate that an associated user equipment includes all access attempt types except for emergency services or Mobile Originated (MO) exception data. As another example, for access category value three (3), the type of access attempt may indicate that an associated user equipment includes access attempts associated with Mobile Originated signaling on a Non-access Stratum (NAS) level resulting from a service other than paging services.

In certain embodiments, each access category value of the plurality of access category values may be mapped to additional information such as a note indicating one or more other parameters. As an example, for access category value one (1), the one or more other parameters may indicate that for Access Category 1 is accompanied with information that defines whether the access category applies to user equipment with one of the following categories: (a) user equipment that are configured for delay tolerant service; (b) user equipment that are configured for delay tolerant service and are neither in their Home Public Land Mobile Network nor a Public Land Mobile Network that is equivalent to it; (c) user equipment that are configured for delay tolerant service and are neither in the Public Land Mobile Network listed as the most preferred Public Land Mobile Network of the country where the user equipment is roaming in the operator-defined Public Land Mobile Network selector list on the SIM/USIM, nor in a Home Public Land Mobile Network that is equivalent to their Home Public Land Mobile Network. When a user equipment is configured for EAB, the user equipment is also configured for delay tolerant services. In case a user equipment is configured both for EAB and for EAB override, when the upper layer indicates to override Access Category 1, then Access Category 1 is not applicable." As another example, for access category value three (3), the barring parameter may indicate that an associated user equipment is barred from accessing Mobile Originated signaling on a Non-access Stratum (NAS) level resulting from a service other than paging services.

As an example, for access category values 32-63, the one or more other parameters may indicate that when there is an access category based on operator classification and a standard access to both of which an access attempt can be categorized, and the standardized access category is neither 0 nor 2, the user equipment applies the access category based on operator classification. When there is an access category based on an operator classification and a standardized access category, both of which an access attempt can be categorized, and the standard access category is 0 or 2, then the user equipment may apply the standard access category.

As another example, for the type of access attempt associated with access category value four (4), a Multimedia Telephony (MMTEL) voice session service may include Real-Time Text (RTT) service. As yet another example, for the type of access attempt associated with access category value seven (7) MO data that does not belong to any other access category may include IP Multimedia Subsystem messaging. As yet another example, for the type of access attempt associated with access category value nine (9) MO IP Multimedia Subsystem registration related to signaling may include data that does not belong to any other access category may include IP Multimedia Subsystem registration related to signaling such as IP Multimedia Subsystem messaging initial registration, re-registration, and subscription refresh. As an example, for access category value ten (10), the one or more other parameters may indicate that category ten applies to a node-B of Internet of Things (IoT), using node-B Internet of Things connectivity to 5GC.

In certain embodiments, the one or more access control parameters may include one or more access category values associated with the one or more multicast broadcast services. When the base station transmits one or more access category access control parameter values associated with one or more multicast broadcast services, the user equipment may receive those access category associated access control parameter values and identify whether the user equipment is barred from sending an access message (for example, an access attempt) for connection setup to request one or more multicast broadcast services associated with the received access category values. For example, the user equipment may receive from the base station an access category value indicating a video streaming multicast broadcast service. The user equipment may match the received access category value with an access category value associated with the video streaming multicast broadcast service that the user equipment seeks to receive and identify that the user equipment is not barred by the base station from transmitting an access message requesting connection setup to access the video streaming multicast broadcast service based on the matching. As discussed herein, the user equipment may subsequently transmit the access message (for example, an access attempt for connection setup) to the base station requesting the video streaming multicast broadcast service from the base station based on the one or more received access category parameters. In certain embodiments, when the base station does not include an access category value that matches an access category value associated with a multicast broadcast service that the user equipment seeks to have access to, the user equipment may identify that the base station is barring the user equipment from sending an access message for connection setup and from receiving the multicast broadcast service and the uniform access control mechanism ends. In certain embodiments, the one or more access category values identifying all multicast broadcast services or one or more particular multicast broadcast services (for example, video streaming multicast broadcast services).

For example, the base station may transmit or broadcast the one or more access control parameters to the group of UEs including the UE based on whether the set of UEs is permitted to establish or resume the RRC connected state with the base station for receiving the multicast broadcast services.

In some aspects, the user equipment may identify whether the UE is barred from transmitting an access request message to establish or resume the RRC connected state for receiving the multicast broadcast services based on the one or more access control parameters. For example, the use equipment may receive the one or more access control parameters from the base station based on whether to permit the user equipment to establish or resume a radio resource control (RRC) connected state with the base station for receiving the multicast broadcast services. After receiving the one or more access control parameters, the user equipment may identify whether the user equipment is barred from transmitting an access request message to establish or resume the RRC connected state for receiving the multicast broadcast services.

At block 906, the user equipment may transmit an access request message to establish or resume the RRC connected state with the base station for receiving the multicast or broadcast services based on the one or more access control parameters. For example, if the access attempt associated with the access category is not barred, then the UE may transmit the access request message to the base station requesting to establish or resume the RRC connected state for receiving multicast broadcast services. The base station may have transmitted these access control parameters to the user equipment through a System Information Block Type 1 (SIB1) message. The one or more access control parameters may have enabled the user equipment to identify whether the user equipment is barred from sending an access attempt (for example, an access message) for connection setup to receive the one or more multicast broadcast services. In response, the user equipment may transmit an access message requesting connection setup to receive the one or more multicast broadcast services. The user equipment may transmit an access message requesting setup to receive the one or more multicast broadcast services based on the one or more access control parameters. For example, the user equipment may transmit an access message to the base station requesting connection setup to receive the one or more multicast broadcast services when the one or more configured access parameters do not indicate that the user equipment is barred from sending an access message requesting connection setup to receive access to the one or more multicast broadcast services or when the one or more configured access parameters indicate that the user equipment is not barred from sending an access message requesting connection setup to receive access to the one or more multicast broadcast services. As an example, if the user equipment is not barred from transmitting an access message requesting connection setup to access the one or more multicast broadcast services (for example, as described in TS 38. 331, Section 5. 3. 14. 5: Access barring check), the user equipment may send an access message such as an RRCSetupRequest message or an RRCResumeRequest message, for example, including a new cause value (for example, an access category value) associated with multicast broadcast services. The new cause value associated with the one or more multicast broadcast services may be mapped to an establish cause or a resume cause also associated with the one or more multicast broadcast services. The new cause value mapped to an establish cause or a resume cause may allow the base station to differentiate between UEs trying to establish multicast broadcast and UEs trying to establish unicast. The new cause value mapped to an establish cause or a resume cause may also allow the base station to identify whether a user equipment is establishing an RRC connection for a first time to receive one or more multicast broadcast services or whether a user equipment is resuming a suspended RRC connection for receiving one or more multicast broadcast services. If the user equipment establishes RRC connection for unicast data and identifies to get multicast broadcast data during the ongoing unicast connection, the user equipment may utilize unicast control to obtain the multicast broadcast data.

At block 908, the user equipment may receive an access rejection message from the base station that indicates that the UE is not permitted to establish or resume the RRC connected state for receiving the multicast or broadcast services. For example, the base station may transmit an access rejection message that indicates, to the user equipment, that the request to establish or resume the RRC connected state is denied based on identifying not to permit the user equipment to establish or resume the RRC connected state for receiving the multicast broadcast services. The base station may identify whether the user equipment is allowed to enter into the RRC connected state for receiving multicast broadcast services based on access message while the base station is in an overload condition. In such a case, the base station may transmit an RRC rejection message to the user equipment if the base station rejects the RRC connection setup due to the base station overload condition.

In certain embodiments, the base station may bar the user equipment from entering the RRC connected state to receive the one or more multicast broadcast services responsive to the access message indicating that the user equipment is attempting at least one of establishing access to the one or more multicast broadcast services or resuming access to the one or more multicast broadcast services. For example, the base station may receive an access message from the user equipment indicating that the user equipment is attempting to establish access to the one or more multicast broadcast service for a first time or after a predetermined time. The base station may not be accepting new user equipment to camp on the base station and receive access to the one or more multicast broadcast services. In response, the base station may not allow the user equipment to enter the RRC connected state to receive the one or more multicast broadcast services through the base station because the user equipment is attempting to establish access to the one or more multicast broadcast service for a first time or after a predetermined time.

In certain embodiments, the base station may not allow the user equipment to enter the RRC connected state and receive the one or more multicast broadcast services base on a type of multicast broadcast service sought by the user equipment. For example, the base station may prioritize a first type of multicast broadcast service over a second type of multicast broadcast service. When, for example, a quality of service is relatively high for multicast broadcast services at the base station, the base station may permit the user equipment to enter the RRC connected state to receive access to both the first type of multicast broadcast service and the second type of multicast broadcast service. However, when, for example, a quality of service is relatively low for multicast broadcast services at the base station, the base station may permit the user equipment to enter the RRC connected state to receive access to the first type of multicast broadcast service, but not allow the user equipment to enter the RRC connected state to receive access to the second type of multicast broadcast service.

At block 910, the user equipment may exchange random access messages with the base station based on the one or more access control parameters indicating that the UE is permitted to establish or resume the RRC connected state for receiving the multicast or broadcast services. For example, responsive to receiving the access message, the base station may identify that one or more quality of service (QoS) parameters associated with the one or more multicast broadcast services are relatively high, a quantity of one or more user equipment receiving access to the one or more multicast broadcast services through the base station is below a threshold quantity, or a data rate of data being accessed by one or more user equipment through the base station is below a threshold data rate. Accordingly, the base station may transmit a response message indicating that the user equipment is allowed to enter the RRC connected state to receive the one or more multicast broadcast services based on the access message and subsequently allow the user equipment to access to the one or more multicast broadcast services. The base station and the user equipment may exchange random access messages based on the base station permitting the user equipment to establish or resume the RRC connected state for receiving the multicast broadcast services.

As another example, the base station may receive an access message from the user equipment indicating that the user equipment is attempting to resume access to the one or more multicast broadcast service after losing access for a relatively short period of time. The base station may be accepting resuming user equipment to camp on the base station and resume access to the one or more multicast broadcast services. In response, the base station may allow the user equipment to enter the RRC connected state and receive the one or more multicast broadcast services through the base station because the user equipment is attempting to resume access to the one or more multicast broadcast service after losing access for a relatively short period of time. The base station and the user equipment may exchange random access messages based on the base station permitting the user equipment to establish or resume the RRC connected state for receiving the multicast broadcast services.

Figure 10:
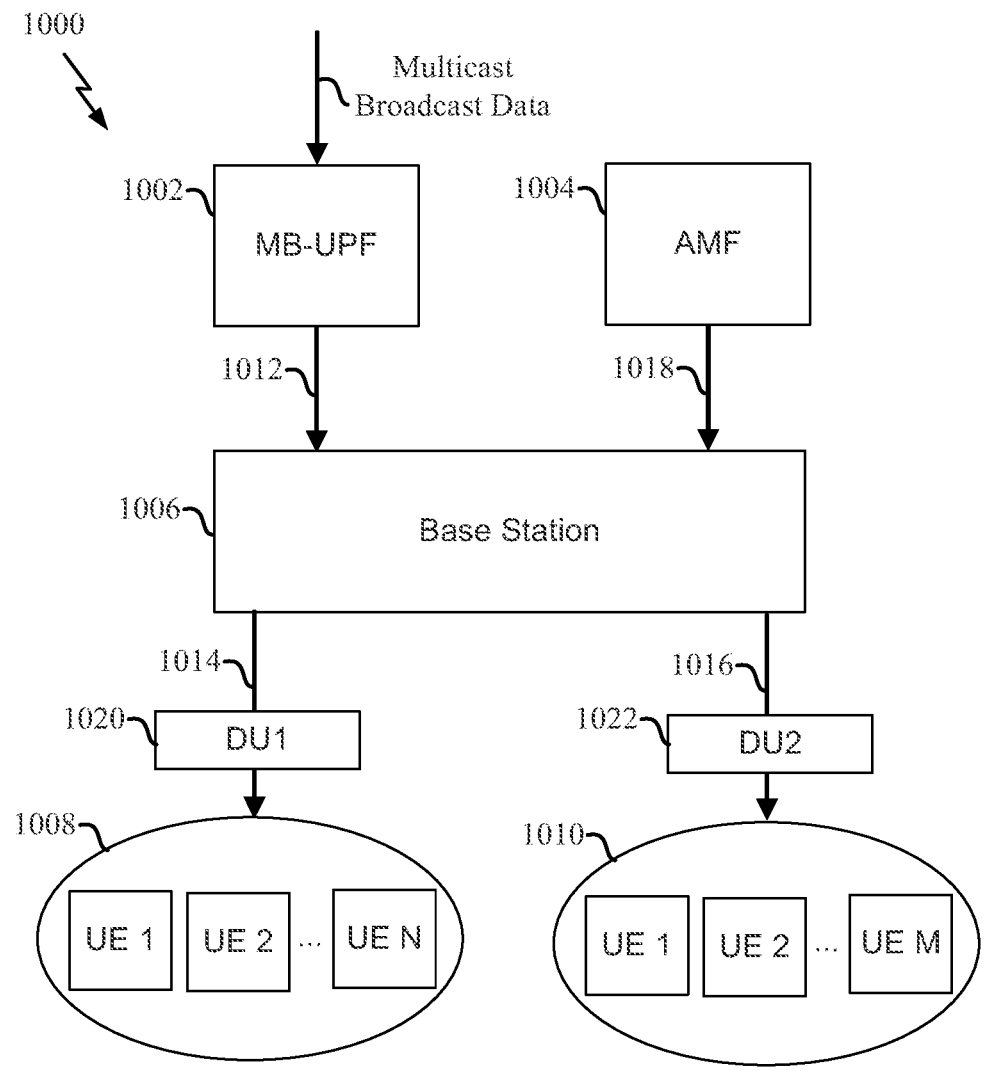
FIG. 10 is an example conceptual diagram illustrating an example 5G Multicast Broadcast System architecture in accordance with some aspects of the disclosure.

FIG. 10 is an example conceptual diagram illustrating an example 5G Multicast Broadcast System architecture 1000 in accordance with some aspects of the disclosure. The 5G Multicast Broadcast System architecture 1000 may include one or more of the systems and components described herein with respect to FIGS. 1-9. The system architecture 1000 may include a multicast broadcast user plane function interface 1002, an access and mobility management function interface 1004, a base station (for example, gNB-CU) 1006, a first set of one or more user equipment 1008, and a second set of one or more user equipment 1010. The system architecture 1000 could be used to transmit a combination of unicast services and multicast broadcast services using Physical Downlink Shared Channels (PDSCHs) with Long-Term Evolution Single Cell Point-to-Multipoint (LTE SC-PTM) as a baseline. It should be understood that Long-Term Evolution Single Cell Point-to-Multipoint may include single cell point to multi-point transmission such that single cell broadcast as first define in Long-Term Evolution Release 13 and broadcast over the Physical Downlink Shared Channel is addressed with a Geolocation based Radio Network Temporary Identifier (G-RNTI). The base station 1006 may receive multicast broadcast quality of service flow or a Temporary Mobile Group Identity (TMGI) over an Multicast Broadcast-N3 tunnel 1012 and may map the quality of service to one or more multicast radio bearers (MRBs) 1014 and 1016 (or dedicated radio bearer (DRB)) associated with user equipment (for example, the first set of one or more user equipment 1008, the second set of one or more user equipment 1010) and through distributed units (for example, DU1 1020, DU1 1022). The system architecture 1000 may combine or utilize close synergies between multicast broadcast services and unicast services by providing flexible switching between dedicate radio bearers and multicast radio bearers and by providing unicast assistance to multicast radio bearers in lower layers. With respect to the interfaces, control signaling for multicast broadcast flow/Temporary Mobile Group Identity setup and modification may be provided from the access and mobility management function interface 1004 through the N2 tunnel 1018 to the base station 1006. The multicast broadcast flow/Temporary Mobile Group Identity delivery over GTP may be provided from the multicast broadcast user-plane interface 1002 through Multicast Broadcast-N3 1012 to the base station 1006.

In a first aspect, a base station may broadcast one or more cell barring parameters to a group of user equipment (UEs) that indicate whether UEs in the group of UEs are permitted to select a cell of the base station for receiving multicast or broadcast services. The base station may also broadcast one or more access control parameters to a set of one or more UEs, of the group of UEs, that are indicated to be permitted to select the cell for receiving the multicast or broadcast services based on the one or more cell barring parameters, the one or more access control parameters indicating whether the set of one or more UEs is permitted to establish or resume a radio resource control (RRC) connected state with the base station for receiving the multicast or broadcast services.

In a second aspect, in combination with at least the first aspect, the base station may receive receiving an access request message from a UE of the set of one or more UEs requesting to establish or resume the RRC connected state for receiving the multicast or broadcast services and may broadcast the one or more access control parameters in response to receiving the access request message.

In a third aspect, in combination with one or more of the first through second aspects, the one or more access control parameters indicate whether the set of one or more UEs is permitted to establish or resume the RRC connected state with the base station for receiving the multicast or broadcast services based on an overload condition at the base station and one of an RRC establishment cause or an RRC resume cause indicated in the access request message.

In a fourth aspect, in combination with one or more of the first through third aspects, the base station may transmit an access rejection message that indicates, to the set of one or more UEs, that the set of one or more UEs is not permitted to establish or resume the RRC connected state for receiving the multicast or broadcast services.

In a fifth aspect, in combination with one or more of the first through fourth aspects, the base station may exchange random access messages with the set of one or more UEs when the one or more access control parameters indicate that the set of one or more UEs is permitted to establish or resume the RRC connected state for receiving the multicast or broadcast services.

In a sixth aspect, in combination with one or more of the first through fifth aspects, wherein the one or more cell barring parameters indicate that the group of UEs is permitted to select the cell of the base station for receiving the multicast or broadcast services when the base station supports multicast or broadcast services.

In a seventh aspect, in combination with one or more of the first through sixth aspects, the one or more access control parameters indicate that the set of one or more UEs is permitted to establish or resume the RRC connected state with the base station for receiving the multicast or broadcast services based on the one or more access control parameters indicating that the group of UEs is permitted to establish or resume the RRC connected state for receiving the multicast or broadcast services.

In an eighth aspect, in combination with one or more of the first through seventh aspects, the one or more access control parameters indicate that the set of one or more UEs is permitted to establish or resume the RRC connected state with the base station for receiving the multicast or broadcast services based on an overload condition at the base station and one of a received RRC establishment cause or a received RRC resume cause.

In a ninth aspect, in combination with one or more of the first through eighth aspects, wherein the set of one or more UEs are UEs seeking to establish or resume the RRC connected state for receiving only multicast or broadcast services.

In a tenth aspect, in combination with one or more of the first through ninth aspects, wherein the one or more access control parameters are associated with a specific access category.

In an eleventh aspect, in combination with one or more of the first through tenth aspects, wherein the one or more barring parameters may be broadcast in a system information block (SIB) or a master information block (MIB).

In a twelfth aspect, in combination with one or more of the first through eleventh aspects, wherein the one or more access control parameters may be broadcast in an SIB.

In a thirteenth aspect, in combination with one or more of the first through twelfth aspects, wherein the one or more cell barring parameters may include at least one of a cellBarred field and a CellReservedforMBSUse field each with an information element indicating whether the group of UEs is permitted to select the cell of the base station for receiving the multicast or broadcast services.

In a fourteenth aspect, in combination with one or more of the first through thirteenth aspects, wherein the multicast or broadcast services may be associated with one of a specific public land mobile network (PLMN) or all public land mobile networks.

In a fifteenth aspect, in combination with one or more of the first through fourteenth aspects, wherein the one or more access control parameters may be associated with all multicast or broadcast services or one or more specific multicast or broadcast services.

In a sixteenth aspect, in combination with one or more of the first through fifteenth aspects, the base station may further transmit a list of one or more multicast or broadcast services to the user equipment using a system information block (SIB).

In a seventeenth aspect, in combination with one or more of the first through sixteenth aspects, the base station may further transmit one or more radio channel condition thresholds to at least the set of UEs of the group of UEs intending to receive the multicast or broadcast service in the RRC connected state.

In an eighteenth aspect, in combination with one or more of the first through seventeenth aspects, the base station may further transmit an indication of available multicast or broadcast services to the group of UEs in a system information block (SIB).

In a nineteenth aspect, in combination with one or more of the first through eighteenth aspects, wherein at least one UE of the group of UEs may be enabled to identify whether or not to select the cell of the base station based on whether or not the UE receives the SIB containing the indication of the available multicast or broadcast services.

In a twentieth aspect, in combination with one or more of the first through nineteenth aspects, wherein the one or more cell barring parameters may include a cellBarredMBS field with a barred information element and a cellReservedForMBSUse field with a false information element, and wherein the base station may further transmit an indication of one or more other frequencies or one or more other cells to the group of UEs for receiving the multicast or broadcast services.

In a twenty-first aspect, a user equipment (UE) may receive one or more cell barring parameters from a base station indicating whether the UE is permitted to select a cell of the base station for receiving multicast or broadcast services. The UE may also receive one or more access control parameters from the base station indicating whether the UE is permitted to establish or resume a radio resource control (RRC) connected state with the base station for receiving the multicast or broadcast services based on the one or more cell barring parameters indicating that the UE is permitted to select the cell of the base station for receiving multicast or broadcast services. The UE may further transmit an access request message to establish or resume the RRC connected state with the base station for receiving the multicast or broadcast services based on the one or more access control parameters.

In a twenty-second aspect, in combination with the twenty-first aspect, wherein the access request message is transmitted to the base station based on the one or more access control parameters indicating that the UE is permitted to establish or resume the RRC connected state with the base station for receiving the multicast or broadcast services.

In a twenty-third aspect, in combination with one or more of the twenty-first through twenty-second aspects, the access request message comprises one of an RRC establishment cause for enabling the base station to permit the UE to establish an RRC connected state with the base station, or an RRC resume cause for enabling the base station to permit the UE to resume an RRC connected state with the base station.

In a twenty-fourth aspect, in combination with one or more of the twenty-first through twenty-third aspects, the UE may further receive an access rejection message from the base station that indicates that the UE is not permitted to establish or resume the RRC connected state for receiving the multicast or broadcast services.

In a twenty-fifth aspect, in combination with one or more of the twenty-first through twenty-fourth aspects, the UE may further exchange random access messages with the base station based on the one or more access control parameters indicating that the UE is permitted to establish or resume the RRC connected state for receiving the multicast or broadcast services.

In a twenty-sixth aspect, in combination with one or more of the twenty-first through thirty-fifth aspects, wherein the UE may seek to establish or resume the RRC connected state for receiving only multicast or broadcast services.

In a twenty-seventh aspect, in combination with one or more of the twenty-first through twenty-sixth aspects, wherein the one or more access control parameters may be associated with a specific access category.

In a twenty-eighth aspect, in combination with one or more of the twenty-first through twenty-seventh aspects, wherein the one or more barring parameters may be received in a system information block (SIB) or a master information block (MIB).

In a twenty-ninth aspect, in combination with one or more of the twenty-first through thirty-eighth aspects, wherein the one or more access control parameters may be received in an SIB.

In a thirtieth aspect, in combination with one or more of the twenty-first through twenty-ninth aspects, wherein the one or more cell barring parameters may include at least one of a cellBarred field and a CellReservedforMBSUse field each with an information element indicating whether the UE is permitted to select the cell of the base station for receiving the multicast or broadcast services.

In a thirty-first aspect, in combination with one or more of the twenty-first through thirtieth aspects, wherein the multicast or broadcast services may be associated with one of a specific public land mobile network (PLMN) or all public land mobile networks.

In a thirty-second aspect, in combination with one or more of the twenty-first through thirty-first aspects, wherein the one or more access control parameters may be associated with all multicast or broadcast services or one or more specific multicast or broadcast services.

In a thirty-third aspect, in combination with one or more of the twenty-first through thirty-second aspects, the UE may further receive a list of one or more multicast or broadcast services from the base station through a system information block (SIB) message.

In a thirty-fourth aspect, in combination with one or more of the twenty-first through thirty-third aspects, the UE may further receive one or more radio channel condition thresholds from the base station based on the UE intending to receive the multicast or broadcast service in the RRC connected state.

In a thirty-sixth aspect, in combination with one or more of the twenty-first through thirty-fifth aspects, the UE may further receive an indication of available multicast or broadcast services from the base station in a system information block (SIB).

In a thirty-seventh aspect, in combination with one or more of the twenty-first through thirty-sixth aspects, wherein the UE may identify whether or not to select the cell of the base station based on whether or not the UE receives the SIB containing the indication of the available multicast or broadcast services.

In one configuration, a base station may include means for broadcasting one or more cell barring parameters to a group of user equipment (UEs) that indicate whether UEs in the group of UEs are permitted to select a cell of the base station for receiving multicast or broadcast services, and means for broadcasting one or more access control parameters to a set of one or more UEs, of the group of UEs, that are indicated to be permitted to select the cell for receiving the multicast or broadcast services based on the one or more cell barring parameters, the one or more access control parameters indicating whether the set of one or more UEs is permitted to establish or resume a radio resource control (RRC) connected state with the base station for receiving the multicast or broadcast services.

In one aspect, the aforementioned means for broadcasting one or more cell barring parameters to a group of user equipment (UEs) that indicate whether UEs in the group of UEs are permitted to select a cell of the base station for receiving multicast or broadcast services, and means for broadcasting one or more access control parameters to a set of one or more UEs, of the group of UEs, that are indicated to be permitted to select the cell for receiving the multicast or broadcast services based on the one or more cell barring parameters, the one or more access control parameters indicating whether the set of one or more UEs is permitted to establish or resume a radio resource control (RRC) connected state with the base station for receiving the multicast or broadcast services may be the processor(s) 604 shown in FIG. 6 configured to perform the functions recited by the aforementioned means. For example, the aforementioned means for broadcasting one or more cell barring parameters to a group of user equipment (UEs) that indicate whether UEs in the group of UEs are permitted to select a cell of the base station for receiving multicast or broadcast services may include the broadcasting circuit 642 together with the transceiver 610 in FIG. 6. As another example, the aforementioned means for broadcasting one or more access control parameters to a set of one or more UEs, of the group of UEs, that are indicated to be permitted to select the cell for receiving the multicast or broadcast services based on the one or more cell barring parameters, the one or more access control parameters indicating whether the set of one or more UEs is permitted to establish or resume a radio resource control (RRC) connected state with the base station for receiving the multicast or broadcast services may include the broadcasting circuit 642 together with the transceiver 610 shown in FIG. 6. In another aspect, the aforementioned means may be a circuit or any apparatus configured to perform the functions recited by the aforementioned means.

In one configuration, a user equipment (UE) may include means for receiving one or more cell barring parameters from a base station indicating whether the UE is permitted to select a cell of the base station for receiving multicast or broadcast services, means for receiving one or more access control parameters from the base station indicating whether the UE is permitted to establish or resume a radio resource control (RRC) connected state with the base station for receiving the multicast or broadcast services based on the one or more cell barring parameters indicating that the UE is permitted to select the cell of the base station for receiving multicast or broadcast services, and means for transmitting an access request message to establish or resume the RRC connected state with the base station for receiving the multicast or broadcast services based on the one or more access control parameters.

In one aspect, the aforementioned means for receiving one or more cell barring parameters from a base station indicating whether the UE is permitted to select a cell of the base station for receiving multicast or broadcast services, means for receiving one or more access control parameters from the base station indicating whether the UE is permitted to establish or resume a radio resource control (RRC) connected state with the base station for receiving the multicast or broadcast services based on the one or more cell barring parameters indicating that the UE is permitted to select the cell of the base station for receiving multicast or broadcast services, and means for transmitting an access request message to establish or resume the RRC connected state with the base station for receiving the multicast or broadcast services based on the one or more access control parameters may be the processor(s) 804 shown in FIG. 8 configured to perform the functions recited by the aforementioned means. For example, the aforementioned means for receiving one or more cell barring parameters from a base station indicating whether the UE is permitted to select a cell of the base station for receiving multicast or broadcast services, and the aforementioned means for receiving one or more access control parameters from the base station indicating whether the UE is permitted to establish or resume a radio resource control (RRC) connected state with the base station for receiving the multicast or broadcast services based on the one or more cell barring parameters indicating that the UE is permitted to select the cell of the base station for receiving multicast or broadcast services may include the receiving circuitry 840 together with the transceiver 810 shown in FIG. 8. As another example, the aforementioned means for transmitting an access request message to establish or resume the RRC connected state with the base station for receiving the multicast or broadcast services based on the one or more access control parameters may include the transmitting circuit 844 together with the transceiver 810 shown in FIG. 8. In another aspect, the aforementioned means may be a circuit or any apparatus configured to perform the functions recited by the aforementioned means.

Several aspects of a wireless communication network have been presented with reference to an example implementation. As those skilled in the art will readily appreciate, various aspects described throughout this disclosure may be extended to other telecommunication systems, network architectures and communication standards.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a base station, comprising:
   broadcasting one or more cell barring parameters to a group of user equipment (UEs) that indicate whether UEs in the group of UEs are permitted to select a cell of the base station for receiving multicast or broadcast services; and
   broadcasting one or more access control parameters to a set of one or more UEs, of the group of UEs, that are indicated to be permitted to select the cell for receiving the multicast or broadcast services based on the one or more cell barring parameters, the one or more access control parameters indicating whether the set of one or more UEs is permitted to establish or resume a radio resource control (RRC) connected state with the base station for receiving the multicast or broadcast services;
   receiving an access request message from a UE of the set of one or more UEs requesting to establish or resume the RRC connected state for receiving the multicast or broadcast services, the access request message indicating one of an RRC establishment cause or an RRC resume cause; and
   broadcasting the one or more access control parameters in response to receiving the access request message.

2. The method of claim 1, wherein the one or more access control parameters indicate whether the set of one or more UEs is permitted to establish or resume the RRC connected state with the base station for receiving the multicast or broadcast services based on an overload condition at the base station.

3. The method of claim 1, further comprising:
   transmitting an access rejection message that indicates, to the set of one or more UEs, that the set of one or more UEs is not permitted to establish or resume the RRC connected state for receiving the multicast or broadcast services.

4. The method of claim 1, further comprising:
   exchanging random access messages with the set of one or more UEs when the one or more access control parameters indicate that the set of one or more UEs is permitted to establish or resume the RRC connected state for receiving the multicast or broadcast services.

5. The method of claim 1, wherein the one or more cell barring parameters indicate that the group of UEs is permitted to select the cell of the base station for receiving the multicast or broadcast services when the base station supports multicast or broadcast services.

6. The method of claim 1, wherein the one or more access control parameters indicate that the set of one or more UEs is permitted to establish or resume the RRC connected state with the base station for receiving the multicast or broadcast services based on the one or more access control parameters indicating that the group of UEs is permitted to establish or resume the RRC connected state for receiving the multicast or broadcast services.

7. The method of claim 1, wherein the one or more access control parameters indicate that the set of one or more UEs is permitted to establish or resume the RRC connected state with the base station for receiving the multicast or broadcast services based on an overload condition at the base station and one of the received RRC establishment cause or the received RRC resume cause.

8. The method of claim 1, wherein the set of one or more UEs are UEs seeking to establish or resume the RRC connected state for receiving only multicast or broadcast services.

9. The method of claim 1, wherein the one or more access control parameters are associated with a specific access category.

10. A base station, comprising:
    a transceiver for wireless communicating with a user equipment (UE); and
    one or more processors electronically coupled to the transceiver and configured to:
       broadcast one or more cell barring parameters to a group of user equipment (UEs) that indicate whether UEs in the group of UEs is permitted to select a cell of the base station for receiving multicast or broadcast services, and
       broadcast one or more access control parameters to a set of one or more UEs, of the group of UEs, that are indicated to be permitted to select the cell for receiving the multicast or broadcast services based on the one or more cell barring parameters, the one or more access control parameters indicating whether the set of one or more UEs is permitted to establish or resume a radio resource control (RRC) connected state with the base station for receiving the multicast or broadcast services;
receive an access request message from a UE of the set of one or more UEs requesting to establish or resume the RRC connected state for receiving the multicast or broadcast services, the access request message indicating one of an RRC establishment cause or an RRC resume cause; and
broadcasting the one or more access control parameters in response to receiving the access request message.

11. The base station of claim 10, wherein the one or more access control parameters indicate whether the set of one or more UEs is permitted to establish or resume the RRC connected state with the base station for receiving the multicast or broadcast services based on an overload condition at the base station.

12. The base station of claim 10, wherein the one or more processors are further configured to:
transmit an access rejection message that indicates, to the set of one or more UEs, that the set of one or more UEs is not permitted to establish or resume the RRC connected state for receiving the multicast or broadcast services.

13. The base station of claim 10, wherein the one or more processors are further configured to:
exchange random access messages with the set of one or more UEs when the one or more access control parameters indicate that the set of one or more UEs is permitted to establish or resume the RRC connected state for receiving the multicast or broadcast services.

14. The base station of claim 10, wherein the one or more cell barring parameters indicate that the group of UEs is permitted to select the cell for receiving the multicast or broadcast services comprises when the base station supports multicast or broadcast services.

15. The base station of claim 10, wherein the one or more access control parameters indicate that the set of one or more UEs is permitted to establish or resume the RRC connected state with the base station for receiving the multicast or broadcast services based on the one or more cell barring parameters indicating that the group of UEs is permitted to select the cell for receiving the multicast or broadcast services.

16. The base station of claim 10, wherein the one or more access control parameters indicate that the set of one or more UEs is permitted to establish or resume the RRC connected state with the base station for receiving the multicast or broadcast services based on an overload condition at the base station and one of the received RRC establishment cause or the received RRC resume cause.

17. The base station of claim 10, wherein the set of one or more UEs are UEs seeking to establish or resume the RRC connected state for receiving only multicast or broadcast services.

18. The base station of claim 10, wherein the one or more access control parameters are associated with a specific access category.

19. A method for wireless communication by a user equipment (UE), comprising:
receiving one or more cell barring parameters from a base station indicating whether the UE is permitted to select a cell of the base station for receiving multicast or broadcast services;
receiving one or more access control parameters from the base station indicating whether the UE is permitted to establish or resume a radio resource control (RRC) connected state with the base station for receiving the multicast or broadcast services based on the one or more cell barring parameters indicating that the UE is permitted to select the cell of the base station for receiving multicast or broadcast services; and
transmitting an access request message to establish or resume the RRC connected state with the base station for receiving the multicast or broadcast services based on the one or more access control parameters, wherein the access request message comprises one of:
an RRC establishment cause for enabling the base station to permit the UE to establish an RRC connected state with the base station; or
an RRC resume cause for enabling the base station to permit the UE to resume an RRC connected state with the base station.

20. The method of claim 19, wherein the access request message is transmitted to the base station based on the one or more access control parameters indicating that the UE is permitted to establish or resume the RRC connected state with the base station for receiving the multicast or broadcast services.

21. The method of claim 19, further comprising:
receiving an access rejection message from the base station that indicates that the UE is not permitted to establish or resume the RRC connected state for receiving the multicast or broadcast services.

22. The method of claim 19, further comprising:
exchanging random access messages with the base station based on the one or more access control parameters indicating that the UE is permitted to establish or resume the RRC connected state for receiving the multicast or broadcast services.

23. A user equipment (UE), comprising:
a transceiver for wirelessly communicating with a base station; and
one or more processors electronically coupled to the transceiver and configured to:
receive one or more cell barring parameters from a base station indicating whether the UE is permitted to select a cell of the base station for receiving multicast or broadcast services,
receive one or more access control parameters from the base station indicating whether the UE is permitted to establish or resume a radio resource control (RRC) connected state with the base station for receiving the multicast or broadcast services based on the one or more cell barring parameters indicating that the UE is permitted to select the cell of the base station for receiving the multicast or broadcast services, and
transmit an access request message to establish or resume the RRC connected state with the base station for receiving the multicast or broadcast services based on the one or more access control parameters, wherein the access request message comprises one of:
an RRC establishment cause for enabling the base station to permit the UE to establish an RRC connected state with the base station; or
an RRC resume cause for enabling the base station to permit the UE to resume an RRC connected state with the base station.

24. The UE of claim 23, wherein the access request message is transmitted to the base station based on the one or more access control parameters indicating that the UE is permitted to establish or to resume the RRC connected state with the base station for receiving the multicast or broadcast services.

25. The UE of claim 23, wherein the one or more processors are further configured to receive an access rejection message from the base station that indicates that the UE is not permitted to establish or resume the RRC connected state for receiving the multicast or broadcast services.

26. The UE of claim 23, wherein the one or more processors are further configured to:
   exchange random access messages with the base station based on the one or more access control parameters indicating that the UE is permitted to establish or resume the RRC connected state for receiving the multicast or broadcast services.

\* \* \* \* \*